(12) United States Patent
Singh et al.

(10) Patent No.: US 12,475,521 B2
(45) Date of Patent: Nov. 18, 2025

(54) GRAPHICS PROCESSING SYSTEMS FOR HANDLING VERTEX ATTRIBUTES

(71) Applicant: Arm Limited, Cambridge (GB)

(72) Inventors: Naveen Kumar Singh, Cambridge (GB); Frank Klaeboe Langtind, Melhus (NO)

(73) Assignee: Arm Limited, Cambridge (GB)

( * ) Notice: Subject to any disclaimer, the term of this patent is extended or adjusted under 35 U.S.C. 154(b) by 154 days.

(21) Appl. No.: 18/499,045

(22) Filed: Oct. 31, 2023

(65) Prior Publication Data

US 2024/0169465 A1 May 23, 2024

(30) Foreign Application Priority Data

Nov. 17, 2022 (GB) ..................................... 2217204

(51) Int. Cl.
*G06T 1/20* (2006.01)
*G06T 1/60* (2006.01)
*G06T 11/40* (2006.01)

(52) U.S. Cl.
CPC .................. *G06T 1/20* (2013.01); *G06T 1/60* (2013.01); *G06T 11/40* (2013.01)

(58) Field of Classification Search
CPC .............. G06T 1/20; G06T 1/60; G06T 11/40
USPC .......................................................... 345/537
See application file for complete search history.

(56) References Cited

U.S. PATENT DOCUMENTS

| 2019/0012829 A1* | 1/2019 | Engh-Halstvedt | G06T 1/20 |
| 2019/0073308 A1* | 3/2019 | Charles | G06F 12/0862 |
| 2020/0311862 A1* | 10/2020 | Chung | G06T 1/60 |

* cited by examiner

*Primary Examiner* — Jacinta M Crawford
(74) *Attorney, Agent, or Firm* — Pearl Cohen Zedek Latzer Baratz LLP

(57) ABSTRACT

When generating a graphics processing output by assembling a sequence of one or more of primitives to be processed, vertex attribute processing is performed for vertices of assembled primitives to generate one or more processed vertex attributes for vertices of the assembled primitives. Processed vertex attributes for vertices of assembled primitives are stored in a first storage, and additionally in a second storage. Then when obtaining processed vertex attributes for an assembled primitive, it is checked whether processed vertex attributes for the vertices of the primitive are present in the second storage, and when they are, the processed vertex attributes are read from the second storage, but when the processed vertex attributes are not in the second storage, they are read from the first storage instead.

20 Claims, 9 Drawing Sheets

| | 511 | 384 | 383 | 256 | 255 | 128 | 127 | 0 |
|---|---|---|---|---|---|---|---|---|
| | | | | Vertex packet | | | | |
| 0 | Vertex 3 position | | Vertex 2 position | | Vertex 1 position | | Vertex 0 position | |
| 64 | Vertex 7 position | | Vertex 6 position | | Vertex 5 position | | Vertex 4 position | |
| 128 | Vertex 11 position | | Vertex 10 position | | Vertex 9 position | | Vertex 8 position | |
| 192 | Vertex 15 position | | Vertex 14 position | | Vertex 13 position | | Vertex 12 position | |
| 256 | Vertex 19 position | | Vertex 18 position | | Vertex 17 position | | Vertex 16 position | |
| 320 | Vertex 23 position | | Vertex 22 position | | Vertex 21 position | | Vertex 20 position | |
| 384 | Vertex 27 position | | Vertex 26 position | | Vertex 25 position | | Vertex 24 position | |
| 448 | Vertex 31 position | | Vertex 30 position | | Vertex 29 position | | Vertex 28 position | |
| 512 | Vertex 35 position | | Vertex 34 position | | Vertex 33 position | | Vertex 32 position | |
| 576 | Vertex 39 position | | Vertex 38 position | | Vertex 37 position | | Vertex 36 position | |
| 640 | Vertex 43 position | | Vertex 42 position | | Vertex 41 position | | Vertex 40 position | |
| 704 | Vertex 47 position | | Vertex 46 position | | Vertex 45 position | | Vertex 44 position | |
| 768 | Vertex 51 position | | Vertex 50 position | | Vertex 49 position | | Vertex 48 position | |
| 832 | Vertex 55 position | | Vertex 54 position | | Vertex 53 position | | Vertex 52 position | |
| 896 | Vertex 59 position | | Vertex 58 position | | Vertex 57 position | | Vertex 56 position | |
| 960 | Vertex 63 position | | Vertex 62 position | | Vertex 61 position | | Vertex 60 position | |

FIG. 6

GRAPHICS PROCESSING SYSTEMS FOR HANDLING VERTEX ATTRIBUTES

BACKGROUND

The technology described herein relates to graphics processing systems, and in particular to methods of and apparatus for preparing primitives to be processed when rendering an output in a graphics processing system.

Computer graphics systems typically produce their output, such as frames for display, by processing so-called primitives, which are usually simple polygons such as triangles. Each primitive is normally defined plural vertices (e.g. three vertices in the case of a triangular primitive).

Typically the set of vertices to be used for a given graphics processing output (e.g. frame for display) will be stored as a set of vertex data defining the vertices (e.g. the relevant attributes for each of the vertices).

While it would be possible simply to store the vertices to be used for each primitive to be generated in turn (such that, in effect, the set of vertices will correspondingly define the primitives to be processed), it is also known to define the primitives separately in terms of a set of indices that reference the vertices in the set of vertex data. This can then avoid, for example, the need to duplicate vertices in the set of vertex data, as a single vertex entry (vertex) in the set of vertices can be referred to multiple times by reusing the relevant index in the set of indices.

Accordingly, in the case of a typical graphics processing pipeline, the initially provided data for an output to be generated will, inter alia, comprise a set of vertices to be used and processed for generating the output, and a set (sequence) of indices referencing the set of vertices (to, in effect, define how the vertices will be used to form a set of primitives to be processed when generating the output).

Each vertex will have associated with it a set of data (such as position, colour, texture and other attributes) representing the vertex. This "vertex" data is then used when processing a primitive that includes the vertex in order to generate the desired output of the graphics processing system.

Once the vertices and sets of vertex indices for an output have been generated, they can be processed by a graphics processor to generate the desired graphics processing output (render target), such as a frame for display.

This will comprise, inter alia, "assembling" primitives using the vertices based on the set (sequence) of vertex indices, and then processing the so-assembled primitives.

The primitive processing may involve, for example, determining which sampling positions of an array of sampling positions associated with the output area to be processed are covered by a primitive, and then determining the appearance each sampling position should have (e.g. in terms of its colour, etc.) to represent the primitive at that sampling position. These processes are commonly referred to as rasterising and rendering, respectively.

The rasterising and rendering processes use the vertex attributes associated with the vertices of the primitive that is being processed. To facilitate this operation at least some of the attributes of the vertices defined for the given graphics processing output are usually subjected to an initial so-called "vertex shading" (vertex processing) operation, before the primitives are, e.g. rasterised and rendered. This "vertex shading" operation operates to transform the attributes for a vertex into a desired form for the subsequent graphics processing operation(s). This may comprise, for example, transforming vertex position attributes from the model or user space that they are initially defined in, to the screen space that the output of the graphics processing is to be displayed in.

A graphics processing pipeline executed by a graphics processor will typically therefore include a vertex processing stage (a vertex shader) that executes vertex processing (shading) computations on initial vertex attribute values defined for the vertices so as to generate a desired set of output vertex attributes (i.e. appropriately "shaded" attributes) for use in the subsequent processing stages of the graphics processing pipeline.

There will then be an appropriate "primitive assembly" operation that "assembles" the primitives that are to be processed by the graphics processing pipeline from the provided indices and vertices, e.g. in accordance with a defined primitive type or types that are to be assembled using the provided indices and vertices.

The so-assembled primitives will then be processed, e.g. rasterised and rendered.

FIG. 1 illustrates this graphics processing sequence when generating an output.

As shown in FIG. 1, for an output to be generated, a set of scene data 11, including, inter alia, a set of vertices, and a set of indices defining primitives to be processed for the output and referencing the set of vertices, is provided.

The vertices then undergo appropriate vertex processing (shading) 12, e.g. to transform the positions for the vertices from "model" space to "screen" space.

There is then a primitive assembly stage 13 which takes the indices and the processed vertices and assembles primitives for processing using the indices and the vertices, e.g. in accordance with information indicating how the primitives are to be assembled using the indices (e.g. whether primitives in the form of simple triangles, triangle strips, or triangle fans, etc., should be generated for processing).

The assembled primitives are then rasterised 14 to generate appropriate graphics fragments for processing, and the fragments generated by the rasteriser are then processed appropriately (rendered) 15 to provide the final output, e.g. image 16.

The Applicants believe that there remains scope for improvements to the operation of such graphics processing.

BRIEF DESCRIPTION OF THE DRAWINGS

Embodiments of the technology described herein will now be described by way of example only and with reference to the accompanying drawings, in which:

FIG. 6 shows an example vertex packet in an embodiment of the technology described herein;

Like reference numerals are used for like features in the Figures, where appropriate.

DETAILED DESCRIPTION

Figure 1:
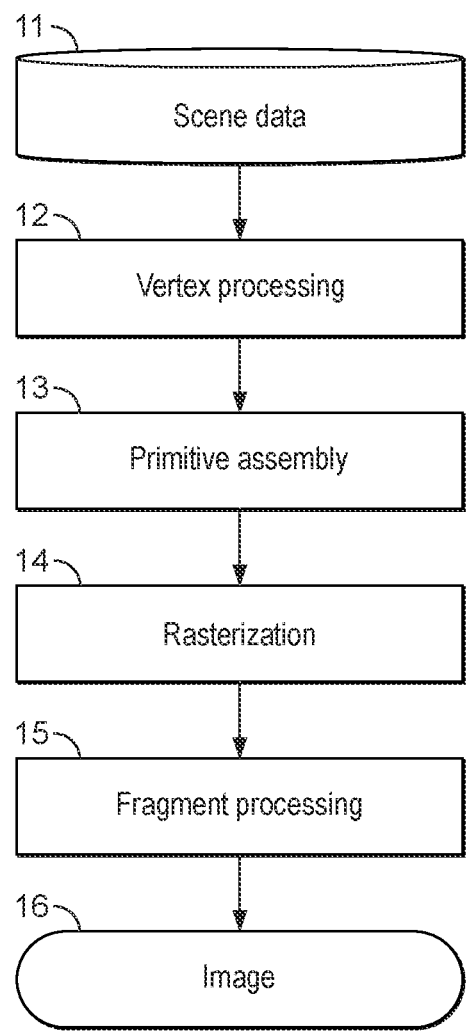
FIG. 1 shows an exemplary sequence of graphics processing.

In one embodiment, the technology described herein comprises a method of operating a graphics processor when processing a sequence of one or more primitives for an output; the method comprising:

performing vertex attribute processing for vertices of primitives of the sequence of one or more primitives, to generate one or more processed vertex attributes for vertices of the primitives;

storing processed vertex attributes for vertices of the primitives in a first storage, and additionally storing processed vertex attributes for vertices of the primitives in a second storage;

for a primitive of the sequence of one or more primitives, obtaining processed vertex attributes for the primitive, wherein the obtaining processed vertex attributes for the primitive comprises checking whether corresponding processed vertex attributes for the vertices of the primitive are present in the second storage, and when the corresponding processed vertex attribute for a vertex of the primitive is present in the second storage then reading the corresponding processed vertex attribute from the second storage, and when a corresponding processed vertex attribute for a vertex of the primitive is not present in the second storage then reading the corresponding processed vertex attribute from the first storage; and providing primitives of the sequence of one or more primitives and read processed vertex attributes to a later stage of the graphics processing pipeline that is being executed by the graphics processor for processing.

In another embodiment, the technology described comprises a graphics processor operable to process a sequence of one or more primitives when generating an output, the graphics processor comprising:

a vertex attribute processing circuit configured to perform vertex attribute processing for vertices of primitives of the sequence of one or more primitives, to generate one or more processed vertex attributes for vertices of the primitives of the sequence of one or more primitives;

storage comprising a first storage and a second storage, wherein the graphics processor is configured to store processed vertex attributes for primitives of the sequence of one or more primitives in the first storage, and additionally store processed vertex attributes for vertices of primitives of the sequence of one or more primitives in the second storage;

an attribute obtaining circuit configured to obtain processed vertex attributes for primitives of the sequence of one or more primitives, wherein the attribute obtaining circuit is configured to, when obtaining processed vertex attributes for a primitive of the sequence of one or more primitives, check whether corresponding processed vertex attributes for the vertices of the primitive are present in the second storage, and when a corresponding processed vertex attribute for a vertex of a primitive is present in the second storage then read the corresponding processed vertex attribute from the second storage, and when a corresponding processed vertex attribute for a vertex of a primitive is not present in the second storage then read the corresponding processed vertex attribute from the first storage; and wherein the graphics processor is configured to provide primitives of the sequence of one or more primitives and read processed vertex attributes to a later stage of the graphics processing pipeline for processing.

The technology described herein relates to graphics processors and graphics processing an output is generated from a sequence of one or more primitives, and in particular in which processed vertex attributes for vertices of primitives of the sequence of one or more primitives are stored in a first storage, and additionally in a second storage. Then when subsequently obtaining vertex attributes for assembled primitives, the processed vertex attributes are read from the second storage if possible, and (only) read from the first storage if the desired processed vertex attributes are not present in the second storage.

In this regard, the Applicant has recognised that efficiency and throughput of obtaining vertex attributes for primitives of a sequence of one or more primitives from which an output is to be generated may be improved by having a second (dedicated, e.g. smaller) storage for that purpose rather than relying solely on reading processed vertex attributes from a larger storage (e.g. such as a vertex cache). The Applicant has recognised that an increase in efficiency and throughput achieved may outweigh a time and hardware cost for providing and additionally loading the second storage with processed vertex attributes.

As will be explained in more detail below, the Applicant has furthermore recognised that, even if the second storage stores vertex attributes for (only) some but not all of the vertices that are stored in the first storage, the second storage may still be effectively and efficiently used when obtaining processed vertex attributes for primitives of the sequence of one or more primitives, since the primitives will normally be processed in a predictable order, thereby allowing the second storage to be pre-loaded with vertex attributes for relevant sub-sets of vertices.

Furthermore, and as will be explained in more detail below, the Applicant has recognised that since primitives tend to be localised (being constructed of vertices which are nearby in the order of the set of vertices to be processed), and since adjacent primitives in the sequence of one or more primitives may relate to at least some of the same vertices, it may be reasonably likely for primitives to require vertex attributes which are stored within and obtainable from the second storage (even if the second storage stores processed vertex attributes for fewer vertices than the first storage).

The graphics processor may be further configured to (and the method of operating the graphics processor may comprise) assemble (assembling) the sequence of one or more of primitives to be processed from a set of vertex indices provided for the output based on primitive configuration information provided for the output, each assembled primitive of the sequence of one or more primitives comprising an identifier for the primitive and a set of one or more vertex indices for the primitive, and to perform (performing) vertex attribute processing for those assembled primitives of the sequence of one or more primitives.

Hence, in an embodiment, the technology described herein comprises a method of operating a graphics processor that executes a graphics processing pipeline to generate an output, in which a set of vertices to be used for primitives to be processed when generating the output, each vertex having associated with it a set of one or more vertex attributes, together with a set of vertex indices referencing vertices in the set of vertices and primitive configuration information indicating how the vertex indices are to be assembled into primitives for processing when generating the output, are provided; the method comprising:

assembling a sequence of one or more of primitives to be processed when generating the output from the set of vertex indices provided for the output based on the primitive configuration information provided for the output, each assembled primitive of the sequence of one or more primitives comprising an identifier for the primitive and a set of one or more vertex indices for the primitive;

performing vertex attribute processing for vertices of assembled primitives of the sequence of one or more assembled primitives, to generate one or more processed vertex attributes for vertices of the assembled primitives;

storing processed vertex attributes for vertices of assembled primitives in a first storage, and additionally storing processed vertex attributes for vertices of assembled primitives in a second storage;

for an assembled primitive of the sequence of assembled primitives, obtaining processed vertex attributes for the primitive, wherein the obtaining processed vertex attributes for the primitive comprises checking whether processed vertex attributes for the vertices of the primitive are present in the second storage, and when the processed vertex attribute for a vertex of the primitive is present in the second storage then reading the processed vertex attribute from the second storage, and when a processed vertex attribute for a vertex of the primitive is not present in the second storage then reading the processed vertex attribute from the first storage; and providing the assembled primitives and read processed vertex attributes to a later stage of the graphics processing pipeline that is being executed by the graphics processor for processing.

In other embodiment, the technology described herein comprises a graphics processor operable to execute a graphics processing pipeline to generate an output; the graphics processor comprising:

a primitive assembly circuit configured to generate a sequence of one or more of primitives to be processed when generating an output from a set of vertex indices provided for the output, the set of vertex indices referencing vertices in a set of vertices provided for the output, each vertex having associated with it a set of one or more vertex attributes, based on primitive configuration information provided for the output, the primitive configuration information indicating how the vertex indices are to be assembled into primitives for processing when generating the output, each assembled primitive of the sequence of assembled primitives comprising an identifier for the primitive and a set of one or more vertex indices for the primitive;

a vertex attribute processing circuit configured to perform vertex attribute processing for vertices of the assembled primitives of the sequence of assembled primitives, to generate one or more processed vertex attributes for vertices of the assembled primitives;

storage comprising a first storage and a second storage, wherein the graphics processor is configured to store processed vertex attributes for assembled primitives in the first storage, and additionally store processed vertex attributes for vertices of assembled primitives in the second storage;

an attribute obtaining circuit configured to obtain processed vertex attributes for assembled primitives, wherein the attribute obtaining circuit is configured to, when obtaining processed vertex attributes for an assembled primitive, check whether processed vertex attributes for the vertices of the primitive are present in the second storage, and when a processed vertex attribute for a vertex of a primitive is present in the second storage then read the processed vertex attribute from the second storage, and when a processed vertex attribute for a vertex of a primitive is not present in the second storage then read the processed vertex attribute from the first storage; and wherein the graphics processor is configured to provide the assembled primitives and read processed vertex attributes to a later stage of the graphics processing pipeline for processing.

The set of vertices to be used for primitives to be processed when generating the output, the set of vertex indices referencing vertices in the set of vertices, and the primitive configuration information indicating how the vertex indices are to be assembled into primitives for processing when generating the output, that are used and provided in the technology described herein may be provided in any suitable and desired manner. They may, for example, be provided by an application that requires the graphics processing in question, and/or be generated and then provided by a driver for the graphics processor, e.g., and in an embodiment, in response to commands and data received from an application that requires graphics processing.

The vertices, vertex indices and primitive configuration information can be made available to the graphics processor in any suitable and desired manner. For example, and in an embodiment, the vertices and vertex indices at least may be stored (e.g., and in an embodiment, as appropriate arrays) in storage (memory) from where they can then be fetched by the graphics processor for use. The primitive configuration information may equally be stored in storage (memory) for use by the graphics processor. It may, for example, be provided in the form of a descriptor associated with and for the output to be generated.

The sets of vertices and vertex indices that are being processed can be any desired and suitable sets of vertices and vertex indices to be processed when generating an output. Thus, the sets of vertices and vertex indices may comprise (and in one embodiment do comprise) the entire set of vertices and the entire set of vertex indices defined for a given graphics processing output, such as for a frame to be displayed. They may also comprise a set of vertices and set of vertex indices that is defined for less than the entire output, such as a set of vertices and a set of vertex indices defined for a given draw call, and/or for a tile to be generated (in a tile-based graphics processor and graphics processing pipeline). In an embodiment, the set of vertices and set of vertex indices are a set of vertices and a set of vertex indices defined for a draw call.

Correspondingly, the output that is being generated may comprise an entire (complete), e.g. frame, or only part of an overall output (e.g. frame), such as a (rendering) tile.

Where the sets of vertices and vertex indices are less than the entire sets of vertices and vertex indices defined for a given output, then in an embodiment the operation in the manner of the technology described herein is repeated for each set of vertices and vertex indices (e.g., and in an embodiment, for each draw call and/or tile) for the output. Correspondingly, the process of the technology described herein is in an embodiment repeated for plural, and in an embodiment for each, output to be generated, e.g. for successive frames in a sequence of output frames, and/or for each tile making up an overall output, e.g. frame.

Each vertex in the set of vertices will have and has associated with it a set of one or more vertex attributes (vertex attribute data (values)). These vertex attributes can be any suitable and desired attributes that may be associated with a vertex, such as one or more of, and in an embodiment all of: position (e.g. x, y, z, w coordinates/values for the vertex), colour (e.g. RGB values for the vertex), transparency (an alpha value for the vertex), etc. In an embodiment, each vertex has associated with it a position (position data) and one or more other, non-position attributes (data) (varyings), e.g. defining colour, light, normal, texture coordinates, etc, for the vertex in question.

There may also be some attributes that are "per-primitive" (but which are determined in the same way in the vertex shader (per vertex)), with the attribute(s) from the "provoking" vertex then being used for the primitive. Examples of these types of attributes are: primitive ID; layer ID; point size; and a primitive variable rate shading value. The technology described herein can and in an embodiment does, handle such "primitive" attributes in the same way (where it is appropriate to do that).

Each vertex index in the set of vertex indices for the output to be generated will identify (index) a corresponding vertex that is provided in the set of vertices for the output. Thus, the vertices will each be identifiable by a corresponding index that (uniquely) identifies the vertex in the set of vertices. In an embodiment the indices are the "input" indices for the vertices as provided (e.g. by the application/driver) prior to any processing of the vertices.

The same vertex index may appear more than once in the set of vertex indices for the output, and/or it may be the case that some vertices in the set of vertices for the output will not in fact be included in the set of indices for the output.

The set of vertex indices for the output to be generated is in an embodiment provided to the primitive assembly process as an appropriate sequence of vertex indices, in the order in which the indices are to be used for primitives for the output.

The primitive configuration information that is provided for the output can be any suitable and desired information that is indicative of, and that defines, how the vertex indices are to be used for (configured into) the primitives for processing for the output. In an embodiment, the primitive configuration information indicates the type of primitives to be assembled using the sequence of vertex indices, i.e. whether the primitives should, for example, be in the form of triangles, triangle strips, triangle fans, or other forms of configuration (such as lines or points).

The primitive assembly operation and circuit in the technology described herein can use the set of vertex indices, together with the primitive configuration information, defined for the output being generated, to assemble the primitives (of the sequence of one or more primitives) that are then to be processed when generating the output in any suitable and desired manner.

In an embodiment, the primitive assembly process and circuit works its way through the sequence of vertex indices defined for the output (in the vertex index sequence order), and assembles primitives (comprising the sequence of one or more primitives) therefrom based on the configuration information, with each primitive comprising an appropriate sequence of indices (for the primitive configuration required) from the sequence of vertex indices for the output.

Thus the primitive assembly process/circuit should, and in an embodiment does, fetch vertex indices from the set (array) of vertex indices in their (desired) sequence order, and "assemble" respective sub-sequences of the fetched vertex indices corresponding to primitives based on the primitive configuration information. Correspondingly, the primitive assembly process in an embodiment includes a step of fetching the vertex indices from the set (array) of vertices and outputting the vertices as a stream of vertices in the (desired) vertex index order to the primitive assembly process for assembling into primitives.

Correspondingly, the graphics processor, and in an embodiment the primitive assembly circuit, in an embodiment includes an index fetcher (an index fetching circuit) that is operable to read and fetch indices from the (stored) set of indices (from the index array) and output a sequence (stream) of indices for assembling into primitives.

For example, where the primitive configuration indication indicates that primitives in the form of triangles should be generated, the primitive assembly process and circuit will output respective sets of three successive indices from the sequence of vertex indices (thereby providing a sequence of triangles for processing). For triangle strips, again the sequence of assembled primitives will comprise respective sets of three indices from the sequence of vertex indices, but in that case each successive triangle will reuse the last two indexes in the previous triangle (and the index order will, e.g., be reversed)). Other primitive types will be configured correspondingly.

The primitive assembly operation (circuit) is in an embodiment configured to output "complete" primitives only (i.e. sequences of the vertex indices for "complete" primitives only). Thus, where only an "incomplete" or "degenerate" primitive can be assembled from a given set of indices from the index sequence, in an embodiment no primitive is output by the primitive assembly process/circuit.

Thus any "faulty" (incomplete or degenerate) primitives are in an embodiment "removed" at the primitive assembly stage, thereby avoiding performing vertex (attribute) fetching and processing for vertices that are only included in degenerate or incomplete primitives.

Correspondingly, the primitive assembly operation (circuit) is in an embodiment able to recognise and discard any "faulty" (incomplete or degenerate) primitives, such that it will then output only complete primitives for further processing. This may be done, for example, and in an embodiment, in accordance with the graphics API in question.

In an embodiment, the primitive assembly operation/circuit is configured to and operable to output "simple" primitives, such as triangles, lines or points. In an embodiment the primitive assembly operation/circuit is operable to convert more complex primitives (such as line strips, line links, triangle strips, triangle fans, quads, quad strips, lines with adjacency, line strips with adjacency, triangles with adjacency and triangle strips with adjacency) into simpler primitives, such as, and in an embodiment, one or more of: triangles, lines or points (which "simpler" primitives are then output by the primitive assembly process/circuit for further processing).

The output of the primitive assembly process (circuit) is in an embodiment the sequence of one or more (and in an embodiment plural) primitives to be processed, with each primitive that is output from the primitive assembly process in an embodiment comprising an identifier for the primitive and a sequence of vertex indices for the primitive.

The identifier for each output primitive can be any suitable and desired identifier that can be used to uniquely identify the primitive within, e.g., and in an embodiment, the set of primitives in question (e.g. the set of primitives for the output in question). In an embodiment, the primitives are simply numbered in sequence (by the primitive assembly process/circuit) with the sequence number for each primitive acting as its identifier. Other arrangements would, of course, be possible.

In an embodiment, the primitive identifiers assigned by the primitive assembly process (circuit) may be overridden by a later identifier that is generated for and/or assigned to the primitive in question, for example as a result of vertex (attribute) processing. In a such embodiment, the primitives output by the primitive assembly process (circuit) may also have associated with them a flag to indicate whether the identifier allocated to the primitive by the primitive assembly process can be overridden by another (e.g. a later) primitive identifier or not.

The primitive assembly process (circuit) can also output other information (e.g. state) for a (and each) primitive, if desired. (However at this stage the primitive assembly process (circuit) should not, and in an embodiment does not, output any vertex attributes in association with the assembled primitives.)

Thus, in an embodiment, the primitive assembly process of the technology described herein comprises (and the primitive assembly circuit is correspondingly configured to) fetching indices from a sequence of vertex indices defined for the output being generated in the vertex index sequence order, organising (e.g. dividing) the fetched vertex indices into respective sub-sequences of vertex indices corresponding to complete primitives based on the primitive configuration information, and outputting each respective sub-sequence of vertex indices corresponding to a complete primitive as an assembled primitive in association with, at least, an identifier for the primitive (which in an embodiment is a respective sequence number for the primitive).

In the technology described herein, vertex attribute processing is performed for vertices of (assembled) primitives of the sequence of one or more primitives, to generate one or more processed vertex attributes for vertices of the (assembled) primitives.

The vertex attribute processing that is performed for vertices of (assembled) primitives at this stage can comprise any suitable and desired vertex attribute processing that may be performed for vertices of an (assembled) primitive.

The vertex attributes that are processed for the vertices at this stage can be any suitable and desired vertex attributes (attributes that are associated with the vertices of an (assembled) primitive). It would be possible in this regard to process all of the attributes (the data values for all of the attributes) associated with each vertex, or only a subset of some but not all of the attributes for the vertices could be processed at this stage (with, e.g., and in an embodiment, the attributes that are not processed at this stage then being processed at a later stage of the graphics processing pipeline).

In an embodiment, only some, but not all, e.g. one, of the attributes, are processed for vertices of the (assembled) primitives before the (assembled) primitives are sent onwards for processing, with one or more other attributes for vertices of the (assembled) primitives then being processed at a later stage of the graphics processing pipeline.

In the case where only some but not all of the vertex attributes are processed for the vertices of the (assembled) primitives at this stage, then in an embodiment at least a position is processed. In an embodiment, only a position attribute (the position) is processed for a vertex.

Usually there will only be a single position attribute, consisting of (X, Y, Z, W) components. In this case, the vertex attribute that is processed will comprise (at least, and in an embodiment only) that single position attribute. However, there may also be other position attributes, such as a point size or a line width (e.g. when rendering points and lines), which could be processed as well, if desired.

Thus, in an embodiment, only position attribute(s) are processed at this stage (and thus in an embodiment no varyings are processed at this stage), but it would be possible to process one or more other (non-position) attributes as well as one or more position attributes, if desired. Such (non-position) attributes could, for example, be one or more or all of: line width/point size; a primitive shading rate; layer ID; and primitive ID.

(For any attributes that are not processed at this stage (not subjected to any vertex shading at this stage), those attributes can be, and are in an embodiment subjected to any required vertex shading at a later time, e.g. at an appropriate later stage of the graphics processing pipeline, such as the tiler and/or e.g. where they are fetched for use.)

The vertex attribute processing (vertex shading) that is triggered and performed in this regard can be any suitable and desired vertex attribute processing (vertex shading), e.g., and in an embodiment, in dependence upon the vertex attributes that are being processed.

Thus where, as discussed above, a position is processed for a vertex, then in an embodiment the position (position attribute) is subjected to appropriate processing (vertex shading), e.g., and in an embodiment, to transform the position from the (e.g. model) space that it is initially defined in, to the appropriate (e.g. screen) space for the output that is being generated. Thus, in an embodiment, (any) positions of the vertices that are being processed are subjected to an appropriate processing (vertex shading) operation.

When a vertex attribute is subjected to vertex processing (vertex shading), then the processing of the attribute in an embodiment provides both the processed (shaded) attribute value or values itself, together with any other data values, such as state information, that may be generated as a result of the vertex processing (vertex shading). For example, and in an embodiment, in the case of vertex shading a position (position shading), the position shading operation may also, for example, generate one or more parameters (values), such as one or more of: variable rate shading parameter values, a point size, a line width and/or a layer ID, etc. In this case, these additional parameters are in an embodiment also provided along with the "processed" position. Other arrangements would, of course, be possible.

The vertex attribute, e.g. position, processing (shading) can be performed in any suitable and desired manner.

In an embodiment, the graphics processor includes and executes an appropriate vertex attribute processing stage (vertex attribute processing circuit) that is operable and configured to process vertex attributes for vertices defined for a render output, which performs the desired vertex attribute processing. Thus, in an embodiment, the vertex attribute processing stage (circuit) is operable and configured (at least) to process (transform) vertex positions for vertices.

In an embodiment the vertex attribute processing stage (circuit) is operable to, and configured to, execute an appropriate vertex shader (e.g. position shader) to perform the vertex attribute processing (shading), with the result of that vertex shading (e.g. position shading) operation then being stored for a vertex in storage (memory).

Thus, in an embodiment, the graphics processor further comprises one or more execution units (circuits) (shader cores) operable to execute shader programs, including vertex shader programs, to perform processing operations on input data values, and the vertex attribute processing (shading) is performed by the execution unit or units (shader core or cores) executing appropriate vertex shading programs.

The vertex attribute processing for the vertices of (assembled) primitives should, inter alia, identify the vertices that are to be processed, and the vertex attribute processing that is required for those vertices. In an embodiment an appropriate request or requests for the vertex attribute processing is sent to trigger the desired vertex attribute processing.

Thus, in an embodiment, triggering the vertex attribute processing for vertices of (assembled) primitives comprises triggering the execution of an appropriate vertex shader (program) (e.g. a position shader) to perform the vertex shading, e.g., and in an embodiment by sending a vertex (e.g. position) shading request or requests, to trigger the appropriate vertex (e.g. position) shading operation for the attribute or attributes of the vertices in question, and the storing of the processed vertex attributes (e.g. position) (and any other data generated by the vertex shading) in storage (memory).

The request(s) for the vertex attribute processing to be performed can take any suitable and desired form. In an embodiment, the request(s) comprises information needed by the graphics processor to be able to carry out the vertex attribute processing operation, such as, for example, and in an embodiment, (at least) the identity of the vertices to be processed, and an indication of the processing to be performed (e.g. shader program to be executed). In an embodiment the request(s) includes information (an indicator) that identifies it as being a request(s) to trigger the vertex attribute processing operation, and/or an identifier that identifies the request(s). The request(s) may also indicate, and/or allow to be determined, the location in memory at which the output (processed/vertex-shaded attribute) data should be stored.

The requesting of the vertex attribute processing for an (assembled) primitive accordingly in an embodiment uses the vertex indices (from the initially provided set of vertex indices for the output in question) for the vertices of the (assembled) primitives to identify those vertices (and accordingly their corresponding vertex attributes), for the vertex processing.

The request(s) for the vertex attribute processing could be sent directly to an execution unit (shader core) that is configured to execute vertex shading operations. However, in an embodiment, the request(s) is sent to a management circuit of the graphics processor, e.g. that is operable to receive and/or distribute respective processing tasks (jobs) to processing units (functional units) of the graphics processor (which management unit will then issue the vertex shading operation to an available shader processing (execution) core).

In an embodiment, the vertex attribute processing (vertex shading) is performed for plural vertices at a time. For example, and in an embodiment, in the case where the execution units of the graphics processor are operable to execute vertex shading programs for plural vertices together as a group (to execute shader programs for respective groups of plural execution threads (warps), with each execution thread representing a given vertex), then in an embodiment the vertex shading requests for vertices of (assembled) primitives are issued for respective thread groups (warps) as a whole.

The vertex attribute processing itself can be performed in any suitable and desired manner. It will, for example, and in an embodiment, comprise fetching the relevant attributes (e.g. positions) for the vertices of the (assembled) primitives from where they are stored in memory (e.g., and in an embodiment, based on, and using, the vertex indices of the vertices in question), appropriately processing those vertex attributes (e.g., and in an embodiment, subjecting them to appropriate vertex shading), and then storing the processed attributes (e.g. positions) for the vertices in memory.

In the technology described herein, the processed vertex attributes (e.g. transformed positions) for vertices of (assembled) primitives (once they have been generated and, e.g. stored in memory), are provided for use for (assembled) primitives by storing them in a first and additionally in a second storage (as discussed above). The first and second storage used in the technology described herein accordingly, in effect, and in an embodiment, act as, and are used as, (more) local (intermediate) storage for storing the processed vertex attributes for use. The processed vertex attributes may be, for example, and in an embodiment, fetched (loaded) from the memory where they are first stored, into the first and second storage for use.

The processed vertex attributes may be stored in the first and second storage and obtained therefrom for any suitable and desired use (e.g. processing stage of the graphics processing pipeline) for which the processed vertex attributes are required.

In an embodiment, the processed vertex attributes are stored in and obtained from the first and second storage in the manner of the technology described herein for a particular, in an embodiment selected, intended use of the processed vertex attributes. In an embodiment, the vertex attributes are stored in and used from the second storage for only a single, specific intended use of the processed vertex attributes (and are accordingly read from the second storage for a particular, specific use for the processed vertex attributes only).

The processed vertex attributes should be stored in and obtainable from the first vertex storage at least for the same purpose as they are stored in and obtained from the second storage (when the required processed vertex attribute is not available in the second storage for that purpose). It could be the case that the processed vertex attributes are also only stored in and used from the first storage for that same, specific, single purpose as the processed vertex attributes are stored in and used from the second storage for (and in one embodiment that is the case).

However, in an embodiment, the processed vertex attributes are stored in and used from the first storage both for the particular purpose that the vertex attributes are stored in and used from the second storage for, and for one or more, e.g. one, other purpose. Thus in an embodiment, the first storage stores processed vertex attributes both for use when processed vertex attributes cannot be obtained from the second storage, and also for use for obtaining processed vertex attributes for another purpose or purposes (e.g., and in an embodiment, for another stage of the graphics processing pipeline that does not use the second storage for obtaining processed vertex attributes).

Correspondingly, the first storage is in an embodiment readable by (and read by) plural different processing stages (circuits) (masters) of the graphics processing pipeline (whereas the second storage is in an embodiment only readable by (and read by) one processing stage (circuit) (master) of the graphics processing pipeline).

The particular purpose that the processed vertex attributes are stored in and used from the second storage for can be any suitable and desired graphics processing stage and operation that will need the processed vertex attributes for vertices of (assembled) primitives of the sequence of one or more primitives.

In an embodiment, the processed vertex attributes are stored in and obtained from the second storage (and when necessary from the first storage) for the purpose of associating the processed vertex attributes with the (assembled) primitives, and in particular for the purposes of doing that as part of a "late" primitive assembly process that operates to associate processed vertex attributes (and in particular processed vertex positions) with (assembled) primitives for provision to a later stage or stages of the graphics processing pipeline, such as, and in an embodiment, for provision to a tiling stage (a tiling circuit) of the graphics processing pipeline (when performing tile-based graphics processing).

Thus, the second storage is in an embodiment provided (only) for use when and used only when obtaining processed vertex attributes for association with (assembled) primitives (late primitive assembly), and not for use during any later processing by the graphics processor which may occur after obtaining processed vertex attributes for association with (assembled) primitives (e.g. such as tiling, rasterising, rendering).

In this case, the first storage is correspondingly in an embodiment configured to be accessible to and used for the purpose of obtaining processed vertex attributes for association with (assembled) primitives (for "late" primitive assembly) (where the required processed vertex attributes are found not to be available in the second storage), but in an embodiment also for the purposes of providing processed vertex attributes for one or more other, e.g., and in an embodiment later, stage of the graphics processing.

For example, in the case of tile-based graphics processing, there may be, and typically will be, some form of culling, e.g. visibility, check for (assembled) primitives to determine that an (assembled) primitive should actually be added to and included in a primitive list (or otherwise culled and not included in a primitive list). This culling may be, and is in an embodiment, based on the potential visibility of primitives and so may comprise one or more or all of: front/back-face culling, frustum culling, sample aware culling, etc.

In an embodiment, the results of this visibility-culling-based check are used to store processed vertex attributes that have been determined as being needed by later stages of the graphics processing pipeline (outside of the tiler/tiling process) in the main memory, and uses the processed vertex attributes from the first storage for that purpose. Thus in an embodiment, the first storage is also accessible by and used for this later stage of the graphics processing pipeline.

Thus in an embodiment, at least in the case of tile-based graphics processing, the first storage is in an embodiment configured to be also accessible to and used for the purpose of obtaining processed vertex attributes for a later part of the tiling process (the tiler) of the graphics processing pipeline (in addition to being accessible to and used for the purpose of obtaining processed vertex attributes for association with (assembled) primitives for provision to the tiling process (the tiler)).

In an embodiment in this case, where the graphics processor performs a (visibility) culling process as part of the tiling process occurring after associating processed vertex attributes with (assembled) primitives, processed vertex attributes (and particularly processed (shaded) vertex positions) are retained in and used from the first storage for use when performing any (visible) vertex attribute updates in memory following the (visibility) culling process.

Both the first storage and the second storage should, and in an embodiment do, contain, and are configured as, an appropriate set of plural (data) entries, in which processed vertex attributes for vertices of (assembled) primitives can be stored (with each (data) entry storing a corresponding (single) processed vertex attribute). In an embodiment the processed vertex attributes are stored in the first and second storage in association with appropriate identifiers, such as an identifier for the corresponding vertex (which may be the relevant vertex index in the set of vertex indices provided for generating the output, or may be any other suitable vertex identifier), so that (the entry containing) the processed vertex attribute for a desired vertex can be identified in the first and second storage.

The first and second storage may each comprise any suitable and desired number of entries (be able to store the processed vertex attributes for any suitable and desired number of vertices).

In an embodiment, the first storage has a greater capacity (i.e. is able to store more processed vertex attributes) than the second storage. For example, and in an embodiment, the first storage may have capacity to store (processed vertex attributes for) up to 4, 8, 16 or more times as many vertices as the second storage (and in an embodiment up to 8 times as many vertices as the second storage). For example, in an embodiment, the first storage has the capacity to store (processed vertex attributes for) up to 1024 vertices, whereas the second storage has have capacity to store (processed vertex attributes for) up to 128 vertices. The second storage in an embodiment stores processed vertex attributes for some, but not all, of the vertices for which vertex attributes are currently stored in the first storage.

As the first storage effectively acts as a fall-back storage from the second storage, and also, as discussed above, is in an embodiment accessible by (and used by) plural different processing stages (circuits) (masters) of the graphics processing pipeline, it is desirable for the first storage to have a greater capacity for storing processed vertex attributes. (Thus, the first storage of the technology described herein is in an embodiment used as a 'main', larger, vertex attribute storage.)

On the other hand, as the second storage is (in an embodiment) intended to provide processed vertex attributes for a particular processing stage (circuit) (master) of the graphics processing pipeline only (and the first storage is available as a fall-back for obtaining a processed vertex attribute that is not available in the second storage), it is acceptable for the second storage to have a smaller capacity for processed vertex attributes as compared to the first storage.

Correspondingly, the storing of processed vertex attributes in the first and second storage is in an embodiment configured such that the relevant processed vertex attribute (s) for each and every vertex of an (assembled) primitive will pass through the first storage (will be stored in the first storage at some point in time).

In an embodiment, the relevant processed vertex attribute (s) for each and every vertex of each (assembled) primitive also passes through the second storage (will be stored in the second storage at some point in time), although this is not essential, and it may be the case that processed vertex attributes for some vertices of (assembled) primitives will never be stored in the second storage (but they will be, and in an embodiment are, at least stored in the first storage).

The first storage may have any suitable and desired configuration and arrangement (e.g., and in an embodiment, that can achieve the above characteristics for the first storage).

In an embodiment, the first storage is in the form of a cache (is a cache-based storage) (which may be referred to herein as a 'vertex cache'), in an embodiment comprising a plurality of banks. The Applicants have recognised in this regard that a cache may be a particularly suitable storage structure and configuration for acting as the first storage of the technology described herein.

In this case, each cache line should be, and in an embodiment is, operable to (and used to) store processed vertex attribute data for plural vertices. For example, the cache and each cache line, may be divided into plural (in an embodiment distinct, in an embodiment non-overlapping) parts, each part corresponding to a different (cache) bank, with each cache line part operable to store processed vertex attribute data for a (single) respective vertex.

Other storage types and structures could be used for the first storage if desired.

The second storage is in an embodiment a type of storage, and configured, such that processed vertex attributes can be read more efficiently from the second storage than from the first storage. Similarly, the second storage is in an embodiment such that it is (more) likely that more entries will be able to be accessed more often (e.g. simultaneously) in the second storage than in the first storage.

For example, and in an embodiment, entries (processed vertex attributes) in the second storage may be, and are in an embodiment, able to be accessed (written or read) independently of each other and, in an embodiment, such that any desired combination of entries in the second storage can be accessed (written to or read from) in a single processing cycle (which may comprise one or more clock cycles).

In an embodiment, the second storage is configured and operable such that any combination of entries (individual processed vertex attributes) in the second storage, e.g., and in an embodiment, up to, e.g., and in an embodiment, a particular, in an embodiment selected, in an embodiment predetermined, maximum number of entries (e.g., and in an embodiment, up to the maximum read "bandwidth" for the second storage), can be accessed (read) in a single processing cycle.

This may be, and in an embodiment is, in contrast to the operation of the first storage where, if that first storage is, e.g., cache-based and divided into plural banks, there may be a limitation on the number and/or combinations of data entries (storing processed vertex attributes) that can be read in a single processing cycle, such that the flexibility of reading from the first storage is less than the second storage (for example, each cache bank may only be able to be written/read once in a single processing cycle).

In other words, the second storage is in an embodiment configured to allow any desired combination of data entries in the second storage to be accessed (simultaneously) within a processing cycle (e.g. up to a maximum number of data entries that can be accessed in a single processing cycle). This is in comparison to the first storage from which only particular combinations of entries may be able to be accessed per processing cycle (those combinations being more restricted than the combinations of data entries that can be accessed in the second storage).

The second storage may correspondingly have any suitable and desired configuration and arrangement (e.g., and in an embodiment, that can achieve the above characteristics for the second storage). In an embodiment, the second storage is in the form of a cache (cache-based storage), in an embodiment without banks. However, it would be possible to use any suitable and desired configuration for the second storage (e.g., and in an embodiment, that can achieve the above characteristics for the second storage), such as register-based storage for example. In another embodiment, the second storage is other than (is not) a cache (that is other than (is not) a cache-based storage)

As discussed above, the processed vertex attributes should be, and are in an embodiment, loaded (fetched) into the first and second storage from, e.g. main memory, where they are initially stored once generated. The processed vertex attributes can be fetched (loaded) into the first and second storage in this regard in any suitable and desired manner.

The processed vertex attributes are in an embodiment loaded into the first storage from the memory where they are (initially) stored when generated by the vertex attribute processing.

It would also be possible to load processed vertex attributes into the second storage directly from the memory where they are (initially) stored when generated by the vertex attribute processing (and this may, e.g., and in an embodiment, be done when first populating the second storage with processed vertex attributes).

In an embodiment, processed vertex attributes are (at least after initially populating the second storage) written into the second storage from (and via) the first storage. Thus, in an embodiment, at least some processed vertex attributes are first loaded into the first storage, and then written (and in an embodiment copied) from the first storage into the second storage.

Correspondingly, the first storage is in an embodiment able to be read (as an additional read "master" that has access to the first storage) for the purposes of loading data from the first storage into the second storage.

In an embodiment the processed vertex attribute data stored in the second storage is a copy of (duplicates) the data stored in the first storage (such that processed vertex attributes stored the second storage are at the same time also stored in (and not removed from (remain in)) the first storage). Thus in an embodiment, storing processed vertex attributes in the second storage (at least after initially populating the second storage) comprises copying processed vertex attributes from the first storage into the second storage.

In an embodiment, the second storage stores a subset of the processed attribute data that is currently being stored in the first storage (and a copy of that processed vertex attribute data from the first storage). Correspondingly, in an embodiment, the second storage will store processed vertex attribute data for the vertices of a subset of the primitives for which processed vertex attribute data is stored in the first storage (and for fewer primitives than the total number of primitives in the sequence of (assembled) primitives).

Thus, in an embodiment, when first populating the first and second storage with processed vertex attributes (e.g., and in an embodiment, at the beginning of the processing of the given sequence of primitives to be processed), the processed vertex attributes are loaded into the first and second storage from the memory where they are stored, but thereafter any further processed vertex attributes (for the processing in question) are loaded into the second storage from the first storage.

As well as loading processed vertex attributes into the first and second storage, in an embodiment at least, processed vertex attributes can also be evicted from the first and second storage (to, e.g., and in an embodiment, allow existing processed vertex attributes stored in the first and/or second storage to be replaced with new processed vertex attributes required for processing (assembled) primitives). The eviction of processed vertex attributes from (the replacement of processed vertex attributes in) the first and second storage can be performed and operate in any suitable and desired manner.

(The graphics processor correspondingly in an embodiment includes an appropriate processed vertex attribute fetcher(s) (fetching circuit(s)) that is operable to, and configured to, fetch processed vertex attributes into and evict processed vertex attributes from, the first and second storage.)

The processed vertex attributes could be fetched into and evicted from the first and/or second storage on a vertex-by-vertex basis.

In an embodiment, the processed vertex attributes are loaded into and evicted from the second storage, and in an embodiment are loaded into and evicted from both the first and second storage, as respective sets of plural vertices together (i.e. on a vertex set-by-vertex set basis). In an embodiment, and as will be discussed in more detail below, the processed vertex attributes are loaded into and evicted from both the first and second storage as (and, in an embodiment, are generated as) respective vertex packets, each vertex packet containing processed vertex attributes for a plurality of vertices for (assembled) primitives, and the processed vertex attributes are then loaded into and evicted from the first and second storage on a vertex packet-by-vertex packet basis.

In this case a (and in an embodiment each) set of plural vertices (vertex packet) in an embodiment comprises (up to) the same, particular, in an embodiment selected, in an embodiment predetermined, number of vertices, such as up to 4, 16, or 32 vertices. In an embodiment, each set of vertices (vertex packet) (for which processed vertex attributes are stored in the first and second storage) comprises (up to) 64 vertices.

Thus, in an embodiment, a vertex packet comprising processed vertex attributes for the vertices of the vertex packet is fetched (e.g. into the first or second storage) as a whole, i.e. such that the processed vertex attributes for all the vertices of a vertex packet will be fetched for use together (at the same time) (rather than, for example, fetching processed vertex attributes for only some but not all of the vertices of a vertex packet at any given time).

Correspondingly, in an embodiment, the fetching of the processed vertex attributes for vertices of the vertex packets comprises fetching entire generated vertex packets into the first and/or second storage, and the first and second storage are configured and operated to store (and in an embodiment only store) "integer" vertex packets (i.e. do not store only some but not all (part of) a vertex packet).

Correspondingly, when processed vertex attributes are to be evicted from the first or second storage, in an embodiment an entire vertex packet is evicted rather than, for example, evicting only some but not all of the processed vertex attributes for the vertices of a vertex packet.

Thus, in an embodiment, the processed vertex attributes fetcher(s) (fetching circuit(s)) is configured to and operable to control the fetching of (whole) vertex packets into the, e.g., first and/or second storage (and the evicting of (whole) vertex packets from the, e.g. first and/or second storage).

In the case where the processed vertex attributes are loaded into and evicted from the first and second storage as respective vertex packets (sets of plural vertices), then the first and second storage are correspondingly in an embodiment configured so as to have a capacity to store a particular, in an embodiment selected, in an embodiment predetermined, integer number of (whole) vertex packets (sets of vertices). Again, in an embodiment, the second storage has a smaller vertex packet capacity than the first storage.

For example, the first storage may have a capacity to store up to, e.g., eight, or sixteen vertex packets, with the second storage having a capacity to store up to a smaller number of (entire) vertex packets, such as two, three or four vertex packets.

In an embodiment, the second storage has a capacity to store at least two, and in an embodiment has a capacity to store two and only two, vertex packets. This will then allow, for example, one vertex packet stored in the second storage to be in use, while another vertex packet is being loaded into the second storage (with an older vertex packet being evicted from the second storage). The second storage having capacity to store two vertex packets has been found by the Applicants to provide a good balance between the amount of storage area needed for the second storage, and the likelihood of finding desired processed vertex attributes in the second storage when required.

Thus, in an embodiment, the method of the technology described herein comprises (and the graphics processor correspondingly comprises a vertex packet generating circuit configured to):

generating one or more vertex packets using vertex indices for primitives of the sequence of one or more primitives, each vertex packet comprising a plurality of vertices of the (assembled) primitives;

wherein the generating one or more vertex packets using the vertex indices for the primitives of the sequence of one or more primitives comprises:

allocating vertices for primitives of the sequence of one or more primitives to a vertex packet until a threshold number of vertices have been allocated to the vertex packet; and, in an embodiment, after the threshold number of vertices have been allocated to the vertex packet, triggering vertex attribute processing for the vertices of the vertex packet, to thereby generate a vertex packet comprising processed vertex attributes for the vertices of the vertex packet.

In embodiments where the graphics processor is configured to (and the method of operating the graphics processor comprises) assemble (assembling) the sequence of one or more of primitives (as discussed above), then the generating one or more vertex packets in an embodiment comprises generating one or more vertex packets for the assembled primitives, by allocating vertices for assembled primitives of the sequence of one or more assembled primitives to a vertex packet until a threshold number of vertices have been allocated to the vertex packet.

Thus, in an embodiment of the technology described herein, the vertices of the (assembled) primitives of the sequence of one or more primitives are organised into respective vertex packets. The vertex attribute processing (shading) is in an embodiment triggered for respective packets of plural vertices of the (assembled) primitives together (in contrast, for example, to being triggered on an individual vertex-by-vertex basis).

As discussed above, each vertex packet in this regard should, and in an embodiment does, comprise a plurality of vertices of the (assembled) primitives of the sequence of one or more primitives (except, for example, in the case where there is a final, single vertex remaining to be allocated to a new vertex packet), and may comprise any suitable and desired (plural) number of vertices (up to a threshold number of vertices (which threshold number of vertices should, and in an embodiment does, accordingly correspond to a maximum permitted number of vertices that may be allocated to (included in) a vertex packet)).

In an embodiment, a (and each) vertex packet (set of plural vertices) also has associated with it an appropriate identifier for the vertex packet (that at least uniquely identifies the vertex packet within the set of vertex packets for the render output in question), such as, and in an embodiment, an appropriate index (e.g. sequence number) for the vertex packet. In an embodiment, each vertex within a vertex packet is also allocated an identifier for the vertex within the vertex packet (that at least uniquely identifies the vertex within the set of vertices of the vertex packet), such as, and in an embodiment, an appropriate index (e.g. sequence number) for the vertex within the vertex packet.

Vertices for (assembled) primitives may be allocated to a vertex packet (and to the vertex packets) in any suitable and desired manner.

In an embodiment, vertices of (assembled) primitives are allocated to a vertex packet in turn, one after another, until the threshold number of vertices is reached for the vertex packet in question, with a new vertex packet then being started thereafter for any further vertices of (assembled) primitives.

Thus, in an embodiment, the generating of the vertex packets using the vertex indices for the (assembled) primitives comprises allocating vertices for (assembled) primitives to a first vertex packet until the threshold number of vertices have been allocated to the first vertex packet, and once the threshold number of vertices have been allocated to the first vertex packet, thereafter starting a new vertex packet (and allocating any further vertices for (assembled) primitives to the new vertex packet) (again until that vertex packet is "full") (and so on).

In an embodiment, vertices for (assembled) primitives in the sequence of primitives are allocated to packets based on (according to) the order in which they appear in the (assembled) primitives of the sequence of primitives.

It would be possible simply to allocate vertices for primitives in the sequence of primitives (exactly) as they appear in the primitives of the sequence of primitives (for example, by allocating vertices for assembled primitives to vertex packets as the primitives are assembled, such that the vertices are simply allocated to vertex packets as they appear in assembled primitives).

However, in an embodiment, the allocating of vertices of (assembled) primitives to a vertex packet (and to the vertex packets) is configured so as to try to avoid duplication of vertices at least within the same vertex packet. For example, and in an embodiment, the vertices that are present in a vertex packet can be tracked, and it is determined for a new vertex for an (assembled) primitive whether that vertex is already present in a vertex packet or not.

In embodiments a predetermined number of previous packets (and in an embodiment three previous packets) are checked when determining whether a new vertex is already present in a vertex packet. If a vertex is not already present in the predetermined number of (e.g. three) immediately preceding vertex packets then it will be added to the packet currently being generated. In an embodiment, any particular primitive in the sequence of one or more primitives is guaranteed to have its vertices stored within one or more of a particular, in an embodiment selected, in an embodiment predetermined, (maximum) number of (e.g. four) successive vertex packets. In an embodiment where vertex packets are generated as discussed above, the (assembled) primitives that are provided to later stages of the graphics processing after the vertex packets have been generated, rather than using (and being defined with reference to) vertex indices from the set of vertex indices (initially) provided for the output, are instead defined using and use vertex indices that index the vertices (and that reference the vertices) with respect to the generated vertex packets, and in particular within the individual vertex packets.

Thus, in an embodiment, a (and each) (assembled) primitive that is provided to later stages of the graphics processing pipeline (and in an embodiment at least to the late primitive assembly) comprises (in an embodiment in addition to an identifier for the primitive) a set of vertex indices for the primitive, but with each vertex index in the set of vertices indexing and indicating an index within (and with respect to) a generated vertex packet (rather than being a vertex index from the set of vertices (initially) provided for the output). In an embodiment, each vertex index for an (assembled) primitive that is provided to later stages of the graphics processing pipeline comprises an indication of (an identifier for) a vertex packet for the vertex (of the vertex packet that the vertex belongs to (is within)), and an identifier for (e.g. the position (index) of) that vertex within the vertex packet in question.

The vertex packet identifier may, for example, and in an embodiment, be an appropriate index for the vertex packets, and, for example, and in an embodiment, be generated by numbering the vertex packets in the sequence that they are generated.

Correspondingly, each vertex allocated to a vertex packet in an embodiment has a corresponding identifier that (uniquely) identifies the vertex within the vertex packet. Again, in an embodiment, the vertex identifier within a given vertex packet in an embodiment comprises an index for the vertex within the vertex packet, and in an embodiment the vertices are indexed within a vertex packet by numbering the vertices in sequence within the vertex packet. (Other Arrangements would, of Course, be Possible.)

The loading of the processed vertex attributes (e.g., and in an embodiment, the vertex packets containing the processed vertex attributes) into the first and second storage is in an embodiment configured and performed such that the required processed vertex attributes (vertex packet(s)) should be present at least in the first storage, and in an embodiment in the second storage, when the corresponding (assembled) primitives that require those processed vertex attributes (vertex packets) fall to require the processed vertex attributes from the second or first storage (e.g., and in an embodiment, are to be subjected to the late primitive assembly operation).

The vertex attributes (e.g., and in an embodiment, the vertex packets containing the processed vertex attributes) should be, and are in an embodiment, loaded (pre-loaded) into the second storage in advance of when vertex attributes will be needed for later stages of the graphics processing pipeline. Thus, in an embodiment, storing processed vertex attributes in the second storage comprises loading (pre-loading) processed vertex attributes (e.g., and in an embodiment, vertex packets containing the processed vertex attributes) into the second storage in advance of said processed vertex attributes being required (by any primitive in the sequence of primitives) for later stages of the graphics processing pipeline. This is in contrast to, for example, arrangements where processed vertex attributes are retained (buffered) in response to being (and after being) used for processing a primitive for a later stage of the graphics processing pipeline (e.g. in a 'recently used' buffer) in case those processed vertex attributes are needed (again) for a later primitive.

In other words, the storing of the processed vertex attributes (vertex packets) in the first and second storage is in an embodiment coordinated with the processing of (assembled) primitives requiring the relevant processed vertex attributes from the second (and first) storage, and is in an embodiment configured such that a vertex packet containing the relevant processed vertex attributes will be present at least in the first storage when the corresponding (assembled) primitives that are to use vertices of the vertex packet fall to be processed using the vertices from the vertex packet (i.e. will need the processed vertex attributes from the first or second storage).

This can be (attempted to be) achieved in any suitable and desired manner. In an embodiment, the processed vertex attributes (the generated vertex packets) are loaded into both the first and second storage (and evicted from the first and second storage) in the order that they are generated, in turn, i.e. such that the sequence of processed generated vertex packets will be loaded into the first storage and into the second storage in turn, in the sequence order, and pass through the first storage and the second storage in a first-in first-out order.

The Applicants have recognised in this regard that, particularly in the case where vertex packets are generated from (assembled) primitives in sequence as discussed above, the vertex packets comprising the processed vertex attributes will be generated in an order corresponding to the order in which those vertex packets should be required for (assembled) primitives, such that the sequence of use of the processed vertex attributes (vertex packets) for (assembled) primitives will be predictable, and can be based on, and follow, the order in which the processed vertex attributes (the vertex packets) are generated.

Thus, the processed vertex attributes (the vertex packets) are in an embodiment loaded into the first and second storage in the sequence that they are generated from and for the (assembled) primitives, and that should, at least in general, ensure that the processed vertex attributes (the vertex packets) are passed through the first and second storage in the order (sequence) that they will be required for use for (assembled) primitives.

In an embodiment, the first and second storage store at least the most recently generated packet (as generated by the vertex packet generating circuit), in an embodiment along with one or more previously generated packets (according to the order in which previous packets were generated). Storing packets in the first and second storage in the sequence in which they are generated, and storing at least the most recently generated packet in the second storage can make it reasonably likely for vertex attributes required for later processing stage (for which the second storage is provided) to indeed be found in the second storage. The Applicants have found that, in embodiments of the technology described herein, up to 90% of required vertex attributes may be found in the second storage when performing a later processing stage for which the second storage is provided. In an embodiment, the (assembled) primitives are provided to the appropriate later stage of the graphics processing pipeline that will use the processed vertex attributes from the second (and, if necessary the first) storage (such as, and in an embodiment, the late primitive assembly process/stage) with an appropriate delay, such that the (assembled) primitives are expected to be provided for that processing after the processed vertex attributes and vertex packets have been generated and stored in the first and second storage. Thus, there are, e.g., and in an embodiment, appropriate latency hiding mechanisms used to delay the sending of the (assembled) primitives to the late primitive assembly process until the relevant vertex packets have been prepared and fetched (at least) into the first storage.

Such delayed provision of the (assembled) primitives for processing can be achieved in any suitable and desired manner. For example, and in an embodiment, the (assembled) primitives that are (generated and) used to trigger the processing of the vertex attributes and the generation of the vertex packets could be provided to the later processing stage (e.g. late primitive assembly) via an appropriate delay (latency-hiding) mechanism, such as by passing them through an appropriate latency-hiding FIFO.

Alternatively, and in another embodiment, the sequence of (assembled) primitives could be regenerated at a later time (by appropriately repeating the appropriate stages of the primitive assembly process), to thereby provide a (delayed) sequence of (assembled) primitives for processing. Other delay/latency-hiding mechanisms could be used if desired.

In the case of the first storage, once the processing for a render output is begun, the first storage is in an embodiment loaded with processed vertex attributes (vertex packets) as they are generated and as they become available in memory for loading into the first storage (subject to, and up to, the maximum capacity of the first storage). Thus, in an embodiment, the fetching of processed vertex attributes (vertex packets) into the first storage is controlled, inter alia, in accordance with, and based on, the completion of the generation of the processed vertex attributes for vertices of the vertex packets. Thus, when the processing of the vertex attributes for the vertices of a vertex packet is completed (such that a completed vertex packet is stored in the memory), that is in an embodiment signalled appropriately, so that the vertex packet can then be loaded into the first storage as appropriate. For example, and in an embodiment, the completion of the generation of a vertex packet could be signalled to an appropriate vertex packet fetcher (fetching circuit), which will then be operable to load the completed vertex packet into the first storage (at the appropriate time).

Correspondingly, vertex packets are in an embodiment loaded into the first storage as they become ready (and up to the capacity of the first storage). Thus, the vertex packets are in an embodiment loaded into the first storage in turn, in an embodiment in the order (sequence) in which they are generated (as the primitives are assembled). This will then mean that the loading of the vertex packets into the first storage will follow the sequence of the (assembled) primitives, such that the relevant vertex packets should be present in the first storage in the appropriate order for the sequence of (assembled) primitives to be processed.

Correspondingly, processed vertex attributes (vertex packets) are in an embodiment evicted from the first storage e.g., and in an embodiment, in turn, in an embodiment in the order (sequence) in which they were fetched into the first storage (on a first-in-first-out (FIFO) basis), as new generated processed vertex attributes (vertex packets) become available for storing in the first storage, e.g., and in an embodiment, subject to an appropriate eviction control mechanism that may be used to avoid evicting processed vertex attributes (vertex packets) from the first storage until the processed vertex attributes (e.g., and in an embodiment, a given vertex packet) is no longer needed in the first storage.

The vertex packet evicting operation (from the first storage) is in an embodiment configured such that a vertex packet should only be (and will only be) evicted from the first storage (e.g. so that it can be replaced by another vertex packet) once (it has been determined that) the vertices in the vertex packet in the first storage should (will) no longer be required for the desired processing of assembled primitives.

The eviction of vertex packets from the first storage can be controlled such that a vertex packet should only be evicted from the first storage once the vertices in the vertex packet will no longer be required from the first storage for processing of assembled primitives in any suitable and desired manner.

In an embodiment, the use of vertex packets for (assembled) primitives is tracked, and once it is determined from that tracking that processed vertices in a vertex packet will no longer be required from the first storage for (any) assembled primitives, the vertex packet is allowed to be evicted from the first storage (but the vertex packet is not permitted) (is other than permitted) to be evicted from the first storage unless and until the tracking of the use of the vertices in the vertex packet determines that the vertex packet can be (safely) evicted from the first storage).

The use of vertex packets from the first storage for (assembled) primitives can be tracked in any suitable and desired manner. For example, and in an embodiment, the last primitive that uses a vertex packet could be appropriately indicated in the sequence of (assembled) primitives (e.g. by using an appropriate flag) (or equally, the first primitive using a "new" packet could be indicated in the sequence of (assembled) primitives by a "new packet" indicator, the "new packet" indicator being followed by a stream of primitives (mostly) using the vertices belonging to that new packet). In the case of the second storage, as discussed above, again the processed vertex attributes (the vertex packets containing the processed vertex attributes) are in an embodiment stored in the second storage in turn, in an embodiment on a first-in first-out (FIFO) basis, and in an embodiment in the order that the vertex packets are generated as primitives are (assembled). In the embodiment where the second storage has capacity for two vertex packets, there will, accordingly, and in an embodiment, be a current vertex packet in the second storage that is being read for use for (assembled) primitives, with another vertex packet (to be used next) being loaded into the second storage (and replacing the currently oldest vertex packet in the second storage).

Again, the processed vertex attributes (vertex packets) are in an embodiment loaded into the second storage in coordination with, and synchronised to, the processing of (assembled) primitives that will require the processed vertex attributes (in the vertex packets) from the second storage. This can be achieved in any suitable and desired manner.

Thus, unlike the case of the first storage into which vertex packets are (in an embodiment) loaded as the processed vertex attributes are generated (shaded), in the case of the second storage vertex packets are in an embodiment loaded only when required for (in coordination with, and synchronised to) the processing of (assembled) primitives that will require the processed vertex attributes (in the vertex packets) from the second storage. Thus, in embodiments there is a delay between loading a (each) packet into the first storage and (thereafter) loading that (those) packets into the second storage.

In an embodiment, the loading of vertex packets into the second storage is triggered in response to primitives in the sequence of (assembled) primitives having vertices stored in a particular vertex packet. In an embodiment, the vertex packets in which the vertices of primitives in the sequence of (assembled) primitives are stored is tracked, and when a (any) vertex of a primitive in the sequence of (assembled) primitives falls within a new vertex packet (there is a "change" of vertex packet for the vertices in the sequence of (assembled) primitives), that new vertex packet is loaded into the second storage (replacing the oldest vertex packet currently in the second storage). This may, and in an embodiment does, use the vertex packet-based indexing of the vertices for (assembled) primitives in the sequence of (assembled) primitives, to thereby identify when (assembled) primitives using a new vertex packet start to appear in the sequence of (assembled) primitives. In an embodiment this triggering of the loading of a new vertex packet into the second storage is facilitated by providing the sequence of (assembled) primitives to an appropriate second storage vertex packet load trigger process (circuit), that is operable to and configured to identify when there is a change of vertex packet for vertices of a sequence of (assembled) primitives (as may be indicated by a suitable indicator in the sequence of (assembled) primitives as discussed above), and thereby trigger the loading of that new vertex packet into the second storage.

As discussed above, the loading of a vertex packet into the second storage in an embodiment comprises loading the vertex packet from the first storage into the second storage.

The sequence of (assembled) primitives is in an embodiment provided to the second storage vertex packet load trigger process in advance of the corresponding primitives in the sequence of (assembled) primitives requiring the processed vertex attributes for their vertices from the second storage, so as to allow the appropriate vertex packet loading into the second storage to be triggered and (hopefully) completed before the processed vertex attributes actually need to be read from the second storage for the (assembled) primitives in question.

In an embodiment, the sequence of (assembled) primitives for processing is also provided to the relevant processing stage that will read the processed vertex attributes from the second storage (e.g., and in an embodiment, to the late primitive assembly), but with an appropriate delay relative to the provision of the sequence of (assembled) primitives to the second storage vertex packet load trigger process.

Thus, in an embodiment, the sequence of (assembled) primitives is in an embodiment provided both to a second storage vertex packet load trigger process (circuit), to thereby trigger the loading of vertex packets into the second storage, and to the processing stage (circuit) (e.g. late primitive assembly) that will read the processed vertex attributes from the second storage, but with there being an appropriate relative delay between when a given primitive in the sequence will arrive (arrives) at the second storage load trigger and for the processing that will (attempt to) read the processed vertex attributes for that primitive from the second storage.

This may be achieved, e.g., and in an embodiment, through an appropriate latency-hiding mechanism used to hide the loading latency from the first storage into the second storage, for example (and in an embodiment) comprising a latency buffer (e.g. a latency-hiding FIFO) (through which the sequence of assembled primitives is passed).

The relative delay in this regard can be configured in any suitable and desired manner, e.g., and in an embodiment, such that the relevant vertex packet should have been loaded into the second storage by the time the corresponding primitive falls to require its processed attributes from that vertex packet. The delay is accordingly, and in an embodiment, based on how long it will take to load a vertex packet into the second storage (e.g. from the first storage) once its loading has been triggered (such that the (assembled) primitive should not arrive for processing until after sufficient time has been allowed for the vertex packet to be loaded into the second storage).

Thus, for example, the arrangement is in an embodiment such that the loading of a vertex packet into the second storage is performed sufficiently in advance based on the period of time (number of processing cycles) required for loading a vertex packet into the second storage (e.g., and in an embodiment, from the first storage).

Thus, for example, where processed vertex attributes are loaded from first storage comprising a cache-based storage, with a plurality of cache lines each storing processed vertex attributes for plural vertices (across plural banks), wherein a single cache line can be read per cycle, then the number of processing cycles (N) required for loading processed vertex attributes for a vertex packet is in an embodiment calculated as: the number of vertices in the vertex packet, divided by the number of vertices for which attributes are stored in each cache line (i.e. the number of banks). For example, for a vertex packet relating to 64 vertices, and a cache having 4 banks, then N=16.

As discussed above, in an embodiment, a vertex packet is evicted from the second storage when (and whenever) a new vertex packet is loaded into the second storage. Thus, in an embodiment removal (eviction) of processed vertex attributes (of a vertex packet) from the second storage is performed (triggered) when new processed vertex attributes (a new vertex packet) are desired to be stored in the second storage (commence being loaded into the second storage).

Thus, unlike in the case of the first storage, vertex packets are in an embodiment evicted from the second storage without any tracking of whether all the (assembled) primitives that will require the vertex packet have undergone the relevant processing or not (have obtained their processed vertex attributes from the second storage or not).

Correspondingly, the eviction of processed vertex attributes (of vertex packets) from the second storage is in an embodiment performed (controlled (triggered)) independently of eviction of processed vertex attributes (vertex packets) from the first storage. As discussed above, it may be desirable to retain processed vertex attributes (vertex packets) longer in the first storage than in the second storage (since the first storage may be used for processed vertex attributes (vertex packets) during later processing).

Thus, in an embodiment when processed vertex attributes (a vertex packet) are removed (evicted) from the second storage, those processed vertex attributes vertex packet are in an embodiment not removed (evicted) from the first storage (if present).

Once vertex attributes have been processed and stored (in the first and in an embodiment also in the second storage), they may be read from the first or second storage for use, e.g., and in an embodiment, for association with (assembled) primitives of the sequence of (assembled) primitives.

As discussed above, in the technology described herein, when an (assembled) primitive falls to be processed and processed vertex attributes are required for the (assembled) primitive, at least for a particular processing stage of the graphics processing pipeline, such as, and in an embodiment, a late primitive assembly process, the processed vertex attributes for an (assembled) primitive are first sought to be read from the second storage (and when the processed vertex attributes are present in the second storage, are read from the second storage), and are (only) instead read from the first storage when the required processed vertex attributes are not present in the second storage. Thus, when obtaining processed vertex attributes for an (assembled) primitive, the processed vertex attributes are read from the second storage if present in the second storage (and only read from the first storage if not present in the second storage).

(Correspondingly the first storage is (in an embodiment) checked (only) after the second storage has been checked and it has been determined that the processed vertex attributes in question are not present in the second storage.)

Thus there is a second storage which is preferentially used for reading processed vertex attributes for (assembled) primitives, in addition to a first ('main', e.g. larger) storage which is checked (only) if the processed attributes for the desired vertex are not found in the second storage.

The Applicants have recognised in this regard that providing an additional, second (e.g. dedicated) storage for use when obtaining processed vertex attributes for (assembled) primitives may improve efficiency and throughput as compared to if (processed) vertex attributes always had to be obtained from the first storage.

For example, the second storage may be (and is in an embodiment) configured such that processed vertex attributes may be read more effectively from the second storage.

This may also particularly be the case where there are multiple processing stages operable to read from first storage (and thus competing demands on bandwidth for accessing the first storage). By preferentially obtaining processed vertex attributes from the second storage in the manner of the technology described herein, overall competition for access to the first storage can be reduced.

The reading of the processed vertex attributes from the second or first storage is in an embodiment done for each (assembled) primitive in the sequence of (assembled) primitives to be processed in turn (and in an embodiment in the order that they appear in the sequence of (assembled) primitives) and in an embodiment for each vertex of an (assembled) primitive (individually).

Thus, in the technology described herein, obtaining processed vertex attributes for, e.g., association with, an (assembled) primitive in an embodiment comprises checking whether a corresponding processed vertex attribute(s) for a (and each) vertex of the primitive is present in the second storage, and when the corresponding processed vertex attribute(s) for a vertex of the primitive is present in the second storage then reading the corresponding processed vertex attribute(s) from the second storage, and when the corresponding processed vertex attribute(s) for the vertex of the primitive is not present in the second storage then reading the corresponding processed vertex attribute(s) from the first storage.

In an embodiment, the second (and, if necessary the first) storage is checked for the processed vertex attribute(s) for each vertex of a primitive individually. Then, when a processed vertex attribute(s) for a (any) vertex of the primitive is present in the second storage, the corresponding vertex attribute(s) is read from the second storage (and when a processed vertex attribute(s) for a (any) vertex of the primitive is not present in the second storage, the corresponding vertex attribute(s) is read from the first storage).

Thus, in embodiments, when processed vertex attributes for some (but not all) vertices of a primitive are stored in the second storage, then those processed vertex attributes which are present in the second storage will be read from the second storage (whereas processed vertex attributes which are not present in the second storage will be read from the first storage).

Thus it may, for example, be the case, that the processed vertex attribute (e.g. transformed position) for some but not all of the vertices of an (assembled) primitive will be read from the second storage, with the processed vertex attribute (e.g. transformed position) for another vertex or vertices of the (assembled) primitive being read from the first storage.

The vertices (the vertex attributes) to use for (assembled) primitives are in an embodiment determined on the basis of the vertex indices for the (assembled) primitives. Thus, in the embodiment when the (assembled) primitives from the early primitive assembly stage (circuit) have their vertices indicated using a vertex packet-based indexing scheme, it will be identified from the vertex indices for an (assembled) primitive, the vertex packet and the position/index within the vertex packet of the processed attributes for the vertex in question.

Thus, in an embodiment, when an (assembled) primitive falls to undergo processing for which the processed vertex attributes will preferentially be read from the second storage, a lookup is first performed in the second storage to determine whether the required processed vertex attribute(s) is present in the second storage or not.

In an embodiment, this lookup uses the vertex packet ID for the vertex packet where the processed vertex attribute should be stored (in particular in the case where the vertices of the (assembled) primitives are indexed using vertex packet-based indexing, such that the required vertex packet can be determined from a vertex index for the (assembled) primitive), to determine whether the required vertex packet is present in the second storage or not. Thus the corresponding vertex packet(s) containing the processed vertex attributes for the vertices of an (assembled) primitive are in an embodiment determined (e.g., and in an embodiment, from vertex-packet-based indexing of the primitive's vertices) to determine which vertex packet(s) the processed vertex attributes for the primitive are stored in.

When the required vertex packet is present in the second storage, then the corresponding processed vertex attribute (e.g. transformed position) for the vertex in question is read from the vertex packet in the second storage (e.g. using the appropriate index for the vertex within the vertex packet in question).

On the other hand, when the lookup into the second storage determines that the processed vertex attribute (e.g., and in an embodiment, the required vertex packet) is not present in the second storage, then the required processed vertex attribute is read from (the vertex packet) in the first storage (if present in the first storage).

In an embodiment, the first storage contains (is guaranteed to contain) enough processed vertex attributes so that a required processed vertex attribute is expected to be (will be) found in the first storage. This may be particularly the case where, as discussed above, the first storage stores a larger number of vertex packets than the second storage, and packets are loaded into the first and second storage on a first-in-first-out (FIFO) basis according to the order in which packets are generated (and so the vertices stored in vertex packets in the first and second storage generally reflect the order in which vertices fall within primitives in the sequence of primitives to be processed, with the first storage storing a larger number of vertices falling within primitives of the sequence of primitives). This may be particularly the case in embodiments where, as discussed above, when generating the vertex packets any particular primitive is guaranteed to have its vertices stored within one or more of a predetermined number (and e.g. four) successive vertex packets (and the first storage is configured to store more than this predetermined number of packets).

Accordingly, since there is an expectation that the first storage will store any required vertex attribute for a primitive in the sequence of primitives being processed, reading a required vertex attribute from (a vertex packet) in the first packet may comprise (simply) performing a read (without first checking whether the vertex attribute is indeed present in the first storage, e.g. without performing a lookup into first storage and/or without tracking which packets are currently stored in the first storage).

Alternatively, (to provision for the (albeit unlikely) event that a required vertex attribute is not present in the first storage), when it is desired to obtain a vertex attribute from the first storage a lookup could (first) be performed to determine whether the processed vertex attribute is stored in the first storage. This lookup could use the appropriate vertex packet ID to determine whether the required vertex packet is stored in the first storage. Then, when the required vertex packet is determined to be stored in the first storage, the required processed vertex attribute could be read from that vertex packet in the first storage for the vertex for the (assembled) primitive in question.

(In the (unlikely) case that the processed vertex attribute (e.g. vertex packet) is not present in the first storage either, then in an embodiment the processing of the primitive in question is stalled, and the fetching of the relevant vertex packet into the first storage is awaited (and/or triggered), with the obtaining the processed vertex attribute for the primitive from the first and/or second storage then being appropriately repeated.) It should be noted in this regard that in the operation of the technology described herein, in the case where it is determined that a processed vertex attribute (e.g. vertex packet) is not present in the second storage, that simply then triggers an attempt to read the required processed vertex attribute (and the reading of the required processed vertex attribute) directly from the first storage. It should not and does not trigger any attempt to load the required processed vertex attribute (e.g. vertex packet) into the second storage, but rather the fact that there was a miss in the second storage simply results in the required processed vertex attribute being read directly from the first storage instead.

Thus, for example, and in an embodiment, when there is a "miss" for a processed vertex attribute in the second storage, that will not trigger any operation to then load the missing vertex attribute (e.g. vertex packet) into the second storage and a repeated lookup into the second storage to obtain the processed vertex attribute from the second storage at a later time.

On the other hand, in the case of the first storage, when there is a "miss" in the first storage, that will (in an embodiment) stall the processing for the (assembled) primitive and/or trigger and/or await the appropriate fetching of the required processed vertex attribute (e.g. vertex packet) into the first storage.

In order to facilitate this operation, the processed vertex attributes and vertex packets are in an embodiment stored in one or both of (and in an embodiment both of) the first and second storage in association with (identified by) the relevant packet identifier.

It may not be necessary to keep track of which particular packets are (currently stored) in the first and second storage (beyond storing the vertex packet identifiers to facilitate reading of processed vertex attributes from within a stored packet). This may be the case in embodiments where packets are loaded into the first and second storage on a first-in-first-out (FIFO) basis as discussed above, since the packets will be loaded into and evicted from the first and second storage according to the (known) order in which the packets are generated (with the loading into the second storage in an embodiment occurring at a suitable delay after loading into the first storage).

Alternatively, if desired, it could be kept track of the vertices that are (currently stored) in the first and second storage. This could be done in any suitable and desired manner, for example, and in an embodiment, by maintaining and storing information indicative of which vertices are currently stored by the first and second storage. In an embodiment, particularly in the case where the vertices for (assembled) primitives are indicated using vertex-packet-based indexing, it is tracked which vertex packets are currently stored in the vertex buffer by maintaining and storing information indicating which vertex packets are currently stored in the first and second storage (rather than tracking which individual vertices are stored in the first and second storage). Such vertex packet tracking information could take any suitable and desired form. For example, a (vertex packet) bitmap that includes respective entries for each vertex packet (index) could be used to indicate and track whether a given vertex packet is currently stored in the first and/or second storage or not.

As discussed above, in an embodiment, the processed vertex attributes are read from the second storage (and, if necessary, the first storage) for and by a late primitive assembly stage (circuit) that is in an embodiment operable and configured to associate the read processed vertex attributes with the relevant (assembled) primitives, and to output a sequence of (assembled) primitives that include the appropriate read processed vertex attributes, to later stages of the graphics processing pipeline for processing.

Thus in an embodiment, the method of the technology described herein includes (and the graphics processor correspondingly comprises) an "early" primitive assembly stage (circuit) operable to assemble primitives from vertex indices based on the primitive configuration information (as discussed above), which is then followed by a "late" primitive assembly stage (circuit) after the vertex attribute processing and storage, which late primitive assembly process (circuit) outputs a sequence of (assembled) primitives to be processed, with each (assembled) primitive of that stage comprising an identifier for the primitive and a set of one or more processed vertex attributes for (and corresponding to) each vertex for the (assembled) primitive (based on the indicated vertex indices for the (assembled) primitive output from the early primitive assembly stage (circuit)).

The "late" primitive assembly process (circuit) accordingly in an embodiment receives (and/or fetches) as input the (sequence of) (assembled) primitives from the initial (early) primitive assembly stage (circuit) and reads the processed vertex attributes (and any other fetched data) for the (assembled) primitives from the second and/or first storage, and outputs based on and using those inputs, a (corresponding) sequence of (assembled) primitives including, for each primitive, one or more processed vertex attributes for the vertices for the primitive in question. The late primitive assembly process (circuit) should, and in an embodiment does, output the same sequence of (assembled) primitives (and in the same primitive (sequence) order) as the sequence of (assembled) primitives that is output by the initial (early) primitive assembly process (circuit).

The late primitive assembly process (circuit) will output for each primitive the corresponding processed vertex attribute or attributes (and any other data) for that primitive based on the vertex indices for the primitive. Thus, in the embodiment discussed above where the vertex attribute that is processed is a position for each index (vertex), the late primitive assembly process (circuit) will output for each (assembled) primitive, an appropriate set of (in an embodiment appropriately transformed) positions for the primitive, i.e. the (transformed) position for each index (vertex) of the primitive in question.

In the technology described herein, after reading processed vertex attributes for an (assembled) primitive, the (assembled) primitive and read processed vertex attributes are provided to a later stage or stages of the graphics processing pipeline.

Thus, e.g., and in an embodiment, once the (assembled) primitives including the relevant processed (shaded) vertex attributes (e.g. and in an embodiment the shaded vertex positions) have been associated (by the late primitive assembly stage (circuit)), the (assembled) primitives including their read vertex attributes, are in an embodiment (then) provided to later stages of the graphics processing pipeline that the graphics processor executes for processing.

Thus, the (assembled) primitives including their read vertex attributes are passed onwards for the appropriate further processing in order to process those primitives when generating the output.

The processing of the (assembled) primitives can comprise any suitable and desired primitive processing that may be performed when generating an output.

The processing of the primitives in an embodiment comprises at least rendering the primitives to generate, e.g., and in an embodiment, rendered output data for the primitives. The rendering may be performed by, e.g., rasterising the primitives to fragments and then rendering (fragment shading) the so generated fragments. Additionally or alternatively, the primitives may be rendered using ray tracing or hybrid ray tracing techniques.

Correspondingly, the graphics processor in one embodiment further comprises a rasteriser (rasterisation circuit) and a renderer (rendering circuit) (in an embodiment in the form of a programmable fragment shader).

The processing of the (assembled) primitives, such as the rasterisation and rendering of the (assembled) primitives, can be performed in any desired and suitable manner, e.g., and in an embodiment, depending upon and in accordance with the graphics processor and graphics processing pipeline in question. In general, and in an embodiment, the (assembled) primitives are rasterised and/or rendered, etc., as would normally be done for the graphics processor and graphics processing pipeline in question (as once the primitives are (assembled) in the manner of the technology described herein, the primitives are no different to primitives that would have been (assembled) in any other manner).

The (assembled) primitives, including the processed vertex attributes, should be, and are in an embodiment, passed to the next stage (circuit) of the graphics processing pipeline that is being executed by the graphics processor. This may be any suitable and desired stage of a graphics processing pipeline that (e.g. immediately) follows the completion of the primitive assembly stage. For example, in the case of an immediate mode renderer, the (assembled), complete primitives may be passed to the, e.g. rasteriser, for processing.

In the case where the graphics processor is a tile based graphics processor, the (assembled) primitives with their vertex attributes are in an embodiment passed to the tiler (tiling stage) of the graphics processor and graphics processing pipeline for "tiling".

Thus, in an embodiment, the graphics processor is a tile based graphics processor (and the graphics processing pipeline that the graphics processor executes correspondingly performs tile based graphics processing), and the (assembled), complete primitives including their associated fetched (and processed) vertex data (attributes) are first provided to the tiling process (a tiler circuit) of the graphics processor and graphics processing pipeline, for the generation of appropriate primitive lists, before the respective primitives are then further processed (e.g. rasterised and rendered).

The tiling process and operation in these embodiments of the technology described herein can be performed in any suitable and desired manner, such as, and in an embodiment, in accordance with the normal manner for the graphics processor and graphics processing pipeline in question.

Thus the tiling process should, and in an embodiment does, include a determination of which region or regions of a plurality of regions that the render output has been divided into for the tiling process, a respective primitive falls within, and then adding the primitive to a respective primitive list or lists for the region or regions in question. This process may, for example, and in an embodiment, comprise determining a bounding box representative of the position of the primitive within the output, and then comparing the position of that bounding box to the respective regions for which primitive lists can be prepared, to determine which primitive list or lists the primitive should be included (listed) in.

In an embodiment, the tiling process comprises a primitive culling process, e.g., and in an embodiment, to cull primitives based on their potential visibility (as discussed above).

The output of the culling and bounding box generation process (of the tiling process) is in an embodiment correspondingly a set of primitives, together with their corresponding bounding boxes. This in an embodiment comprises an identifier for the primitive, a set of vertex indices for the primitive, and an indication of the bounding box (bounding box information) for the primitive (in an embodiment in terms of which (at the resolution of the) primitive list regions (e.g. rendering tiles) the primitive falls within).

The bounding boxes from the bounding box generation, etc., process, are then in an embodiment used to determine which primitive lists the corresponding primitives should be included in (written to). This is in an embodiment done by an appropriate binning stage (circuit) of the graphics processor and graphics processing pipeline, which outputs a sequence of primitives, together with for each primitive, an indication of the primitive list that the primitive should be included in.

Once it has been determined which primitive list or lists a given primitive (whether a combined primitive or an individual primitive) should be included in, then the primitive is in an embodiment appropriately written into the appropriate primitive list or lists, e.g. in memory. This process may, and in an embodiment does, include appropriately compressing the primitive lists, e.g. as they are being written.

The remaining processing of the primitives can then proceed in any suitable and desired manner. For example, there may be a primitive list reader that reads the primitive lists to determine the primitives to be processed for a rendering tile, and then provides those primitives for processing, e.g. to a further vertex attribute fetching stage/circuit that is configured to fetch vertex attributes for (assembled) primitives that will be needed for the rasterisation and rendering processes, that is then followed by a primitive (triangle) setup stage/circuit.

Following the primitive (triangle) setup stage, the sequence of (assembled) primitives may then be sent onwards for rasterisation and rendering (or for rendering in the case of a non-rasterisation-based renderer).

The rasterisation (if any) and rendering processes can be performed in any suitable and desired manner, and are in an embodiment done in accordance with the normal rasterising and rendering processes for the graphics processor and graphics processing pipeline in question.

Once the primitives have been (rasterised and) rendered, the output of that processing can then, e.g., and in an embodiment, be written, e.g. to, e.g., a frame buffer in, e.g. main memory, from where it can then, e.g., be provided to a display for display, or otherwise processed. This is in an embodiment done via a tile buffer in the case of tile based rendering.

As discussed above, it can be the case, and in an embodiment is the case, that a later stage of the graphics processing, such as a stage after the visibility-based culling of the tiling process, may also require processed vertex attributes. In this case, as discussed above, that later stage of the graphics processing may be configured to (only) seek to obtain such processed vertex attributes from the first storage (and not to attempt to obtain those processed vertex attributes from the second storage).

Thus, in an embodiment, when performing a later stage of graphics processing, occurring after association of primitives with corresponding processed vertex attributes (late primitive assembly), and for which processed vertex attributes are required, the processed vertex attributes are simply and solely obtained (read) from the first storage, without (first) attempting to obtain the processed vertex attributes from the second storage.

Correspondingly, the eviction of processed vertex attributes (e.g. vertex packets) from the first storage is in an embodiment configured and controlled such that processed vertex attributes (vertex packets) should not be evicted from the first storage until any later stage of graphics processing that will also seek to obtain processed vertex attributes from the first storage will no longer require the processed vertex attributes (the vertex packets) in question.

As discussed above, in embodiments, the vertex attribute processing that is performed for vertices at the (early) primitive assembly process triggers the processing of only some but not all of the attributes for each vertex. In this case therefore, other attributes for the vertices of the primitives may be, where necessary, processed (vertex shaded)) during and for subsequent processing of the primitives, at a later point in the graphics processing sequence, e.g. at an appropriate later stage or stages of the graphics processing pipeline, such as by the tiler, and/or, e.g., where the vertex attributes in question are required.

In this case therefore, there will be further processing (vertex shading)) of other vertex attributes for the (assembled) primitives, in addition to the vertex attribute processing that takes place when assembling the primitives.

Thus, in an embodiment, the method of the technology described herein further comprises (and the graphics processor includes a processing circuit or circuits operable and configured to) processing (vertex shading)) other attributes for the vertices of the (assembled) primitives, after the (assembled) primitives including their fetched vertex attribute(s) have been provided to later stages of the graphics processing pipeline that the graphics processor executes.

The above describes the main elements of the graphics processor and graphics processing pipeline that are involved in the operation in the manner of the technology described herein. As will be appreciated by those skilled in the art, the graphics processor can otherwise include and execute, and in an embodiment does include and execute, any one or one or more, and in an embodiment all, of the other processing stages and circuits that graphics processors and graphics processing pipelines may (normally) include. Thus, for example, the graphics processor may also include a primitive setup circuit, a rasteriser circuit and a renderer circuit (in an embodiment in the form of or including a programmable fragment shader), a depth (or depth and stencil) tester, a blender, a tile buffer, a write out circuit, etc.

In an embodiment, the graphics processor comprises, and/or is in communication with, one or more memories and/or memory devices that store the data described herein, and/or that store software for performing the processes described herein. The graphics processor may also be in communication with a host microprocessor, and/or with a display for displaying images based on the output of the graphics processor.

The output to be generated may comprise any useful output that can and is to be generated by the graphics processor and processing pipeline. Thus it may comprise, for example, a tile to be generated in a tile based graphics processing system, and/or a frame of output fragment data. The technology described herein can be used for all forms of output that a graphics processor and processing pipeline may be used to generate, such as frames for display, render-to-texture outputs, etc. In an embodiment, the output is an output frame, and in an embodiment an image.

In an embodiment, the various functions of the technology described herein are carried out on a single graphics processing platform that generates and outputs the (rendered) data that is, e.g., written to a frame buffer for a display device.

The various functions of the technology described herein can be carried out in any desired and suitable manner. For example, unless otherwise indicated, the functions of the technology described herein herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are configured to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry/circuits, etc., if desired.

Furthermore, unless otherwise indicated, any one or more or all of the processing stages of the technology described herein may be embodied as processing stage circuits, e.g., in the form of one or more fixed-function units (hardware) (processing circuits), and/or in the form of programmable processing circuits that can be programmed to perform the desired operation. Equally, any one or more of the processing stages and processing stage circuitry of the technology described herein may be provided as a separate circuit element to any one or more of the other processing stages or processing stage circuits, and/or any one or more or all of the processing stages and processing stage circuits may be at least partially formed of shared processing circuits.

Subject to any hardware necessary to carry out the specific functions discussed above, the graphics processor can otherwise include any one or more or all of the usual functional units, etc., that graphics processors include.

It will also be appreciated by those skilled in the art that all of the described embodiments of the technology described herein can, and, in an embodiment, do, include, as appropriate, any one or more or all of the features described herein.

The methods in accordance with the technology described herein may be implemented at least partially using software e.g. computer programs. It will thus be seen that the technology described herein may provide computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus, in a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CDROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrinkwrapped software, preloaded with a computer system, for example, on a system ROM or fixed disk, or distributed from a server or electronic bulletin board over a network, for example, the Internet or World Wide Web.

Figure 2:
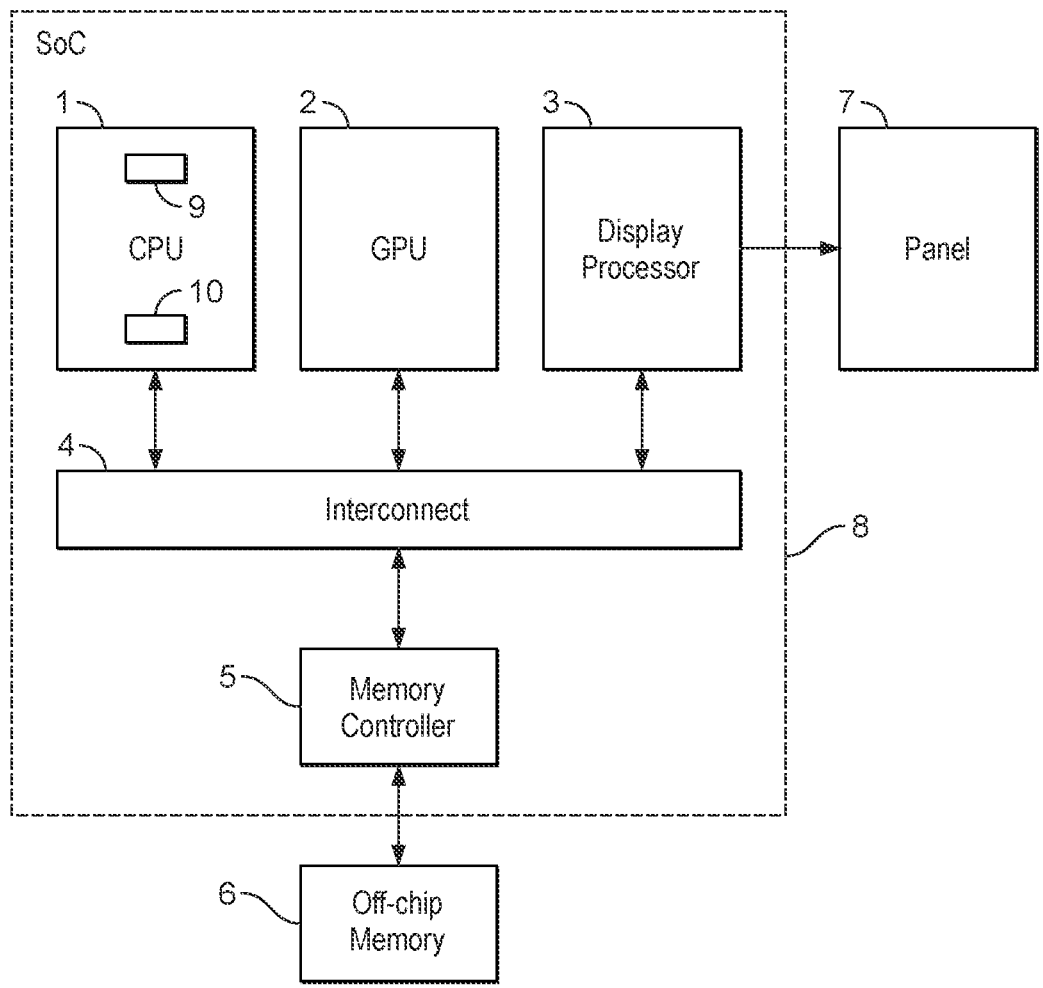
FIG. 2 shows an exemplary data processing system in which the technology described herein may be implemented.

FIG. 2 shows an exemplary system on chip (SoC) graphics processing system 8 that comprises a host processor comprising a central processing unit (CPU) 1, a graphics processor (GPU) 2, a display processor 3, and a memory controller 5. The exemplary data processing system may also comprise a video engine (not shown in FIG. 2). As shown in FIG. 2, these units communicate via an interconnect 4 and have access to off-chip memory 6. In this system, the graphics processor 2 will render frames (images) to be displayed, and the display processor 3 will then provide the frames to a display panel 7 for display.

In use of this system, an application 9 such as a game, executing on one or more host processors (CPUs) 1 will, for example, require the display of frames on the display panel 7. To do this, the application will submit appropriate commands and data to a driver 10 for the graphics processor 2, e.g. that is executing on a CPU 1. The driver 10 will then generate appropriate commands and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display.

In the present embodiment, the graphics processor 2 executes a graphics processing pipeline that processes graphics primitives, such as triangles, when generating an output, such as an image for display. The graphics processing pipeline includes and performs similar operations to those illustrated in the graphics processing sequence shown in FIG. 1.

Figure 3:
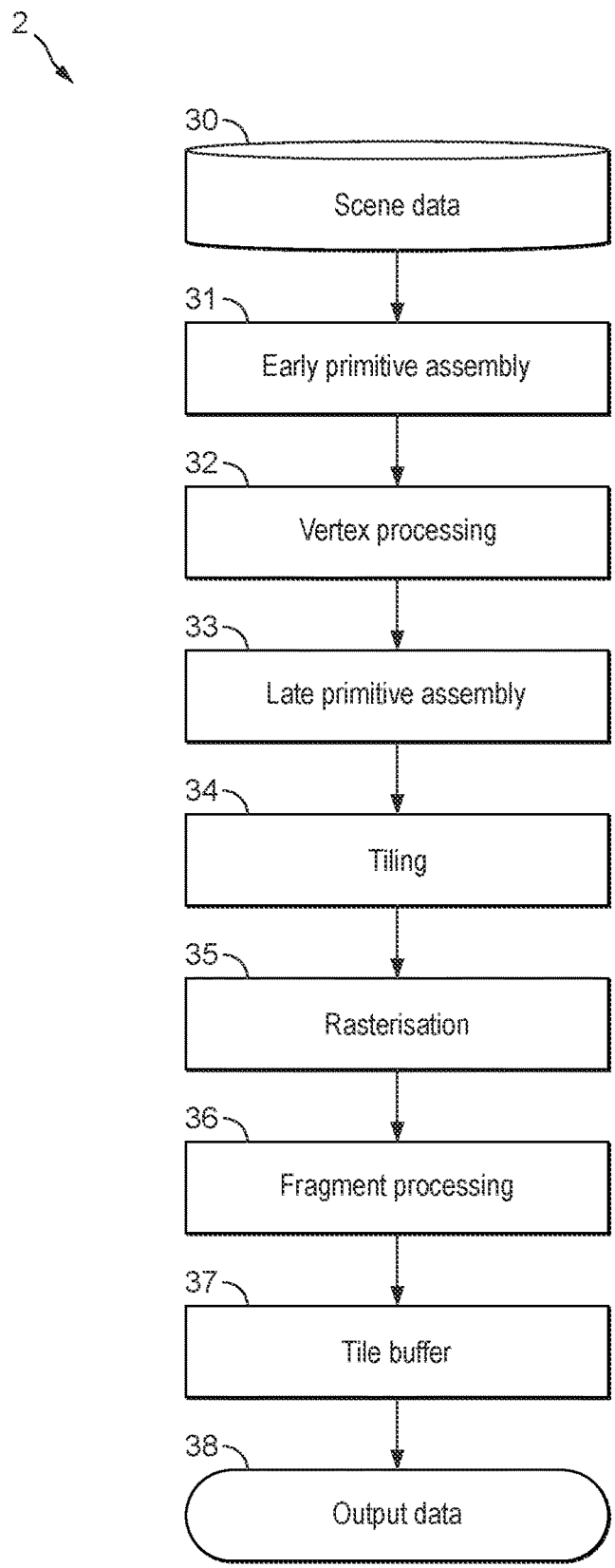
FIG. 3 shows schematically a graphics processor that may be operated in accordance with the technology described herein.

FIG. 3 shows schematically the graphics processor 2 and the processing sequence of the graphics processing pipeline executed by the graphics processor 2 when generating an output in the present embodiments.

FIG. 3 shows the main elements and pipeline stages/circuits. As will be appreciated by those skilled in the art there may be other elements of the graphics processor and processing pipeline that are not illustrated in FIG. 3. It should also be noted here that FIG. 3 is only schematic, and that, for example, in practice the shown functional units and pipeline stages may share significant hardware circuits, even though they are shown schematically as separate stages in FIG. 3. It will also be appreciated that each of the stages, elements and units, etc., of the graphics processor and processing pipeline as shown in FIG. 3 may, unless otherwise indicated, be implemented as desired and will accordingly comprise, e.g., appropriate circuitry, circuits and/or processing logic, etc., for performing the necessary operation and functions.

As shown in FIG. 3, again for an output to be generated, a set of scene data 30, including, inter alia, a set of vertices (with each vertex having one or more attributes, such as positions, colours, etc., associated with it), a set of indices referencing the vertices in the set of vertices, and primitive configuration information indicating how the vertex indices are to be assembled into primitives for processing when generating the output, is provided to the graphics processor, for example, and in an embodiment, by storing it in the memory 6 from where it can then be read by the graphics processor 2.

This scene data may be provided by the application (and/or the driver in response to commands from the application) that requires the output to be generated, and may, for example, comprise the complete set of vertices, indices, etc., for the output in question, or, e.g., respective different sets of vertices, sets of indices, etc., e.g. for respective draw calls to be processed for the output in question. Other arrangements would, of course, be possible.

Then, in the present embodiment, an "early" primitive assembly stage (circuit) 31 operates to assemble primitives for processing using the provided set of indices referencing the vertices based on the provided primitive configuration information, to generate a sequence of assembled primitives, each primitive comprising at this stage an identifier for the primitive and a set of one or more vertex indices for the primitive. This operation will be discussed in more detail below.

The assembled primitives from the primitive assembly stage (circuit) 31 are then used to trigger the fetching and vertex processing (shading) 32 of attributes for the vertices for the assembled primitives. In the present embodiments the fetching of the vertex positions and the transforming of the positions for the vertices from the, e.g. "model" space in which they are initially defined, to the, e.g. "screen", space that the output image is being generated in is triggered and performed at this stage (but the fetching and shading of any other vertex attributes is triggered and performed at later stages of the graphics processing) Again, this operation will be discussed in more detail below.

There is then a "late" primitive assembly stage (circuit) 33 that assembles primitives for further processing from the sequence of primitives output by the early primitive assembly stage (circuit) 31 (and in particular using the indices for those primitives), by associating the primitives output by the early primitive assembly stage (circuit) 31 with the corresponding fetched and shaded vertex attributes from the vertex processing 32, to provide a sequence of assembled primitives, each primitive comprising an identifier for the primitive and the relevant fetched (and shaded) vertex attributes (positions) (and any other fetched data) for the vertices for the primitive. Again, this operation will be discussed in more detail below. Other vertex attributes (varyings), such as colours, transparency, etc., that are needed will be fetched (and as necessary "vertex shaded") later on in the pipeline, for example at the tiling stage (tiler).)

The assembled primitives with the fetched and processed vertex attributes (positions) from the late primitive assembly 32 are first passed to a tiler (tiling circuit) 34 for processing. (It is assumed in this regard that the graphics processor 2 in the present embodiments is a tile-based graphics processor and so generates respective output tiles of an overall output (e.g. frame) to be generated separately to each other, with the set of tiles for the overall output then being appropriately combined to provide the final, overall output.)

The tiler 34 performs the process of "tiling" to allocate the assembled primitives to primitive lists for respective render output regions (areas) which are then used to identify the primitives that should be rendered for each tile that is to be rendered to generate the output data (which may, e.g. be a frame to be rendered for display). For example, the tiler 34 may be implemented using a primitive list building unit which takes the assembled primitives as its input, builds primitive lists using that data, and stores the primitive lists in memory. The tiler may also cull certain primitives that are not visible.

The rasterisation stage (circuit) (rasteriser) 35 takes as its input the primitives (including their vertices), from the primitive list(s) for the tile being rendered, rasterises the primitive to fragments, and provides the fragments to a fragment processing stage (circuit) 36, which in this embodiment comprises a shader execution engine (a shader core). The shader execution engine is a programmable execution unit that performs fragment shading by executing fragment shading software routines (programs) for fragments received from the rasteriser 35.

Each graphics "fragment" that is shaded may correspond to a single pixel (picture element) in the final display (since as the pixels are the singularities in the final display, there may be a one-to-one mapping between the "fragments" the graphics processor operates on (renders) and the pixels of the display). However, it can be the case that there is not a one-to-one correspondence between a fragment and a display pixel, for example where particular forms of post-processing, such as down-scaling, are carried out on the rendered image prior to displaying the final image.

Each fragment will be processed by means of one or more execution threads which will execute the instructions of the shader program in question for the fragment in question. Typically, there will be multiple execution threads each executing at the same time (in parallel).

The output of the fragment processing 36 (the rendered fragments) is written to a tile buffer 37. Once the processing for the tile in question has been completed, then the tile will be written to the output data array 38 in memory, and the next tile processed, and so on, until the complete output data array has been generated. The process will then move on to the next output data array (e.g. frame), and so on.

The output data array 38 may typically be an image for a frame intended for display on a display device, such as a screen or printer, but may also, for example, comprise intermediate render data intended for use in later rendering passes (also known as a "render to texture" output), or for deferred rendering, or for hybrid ray tracing, etc.

Figure 4:
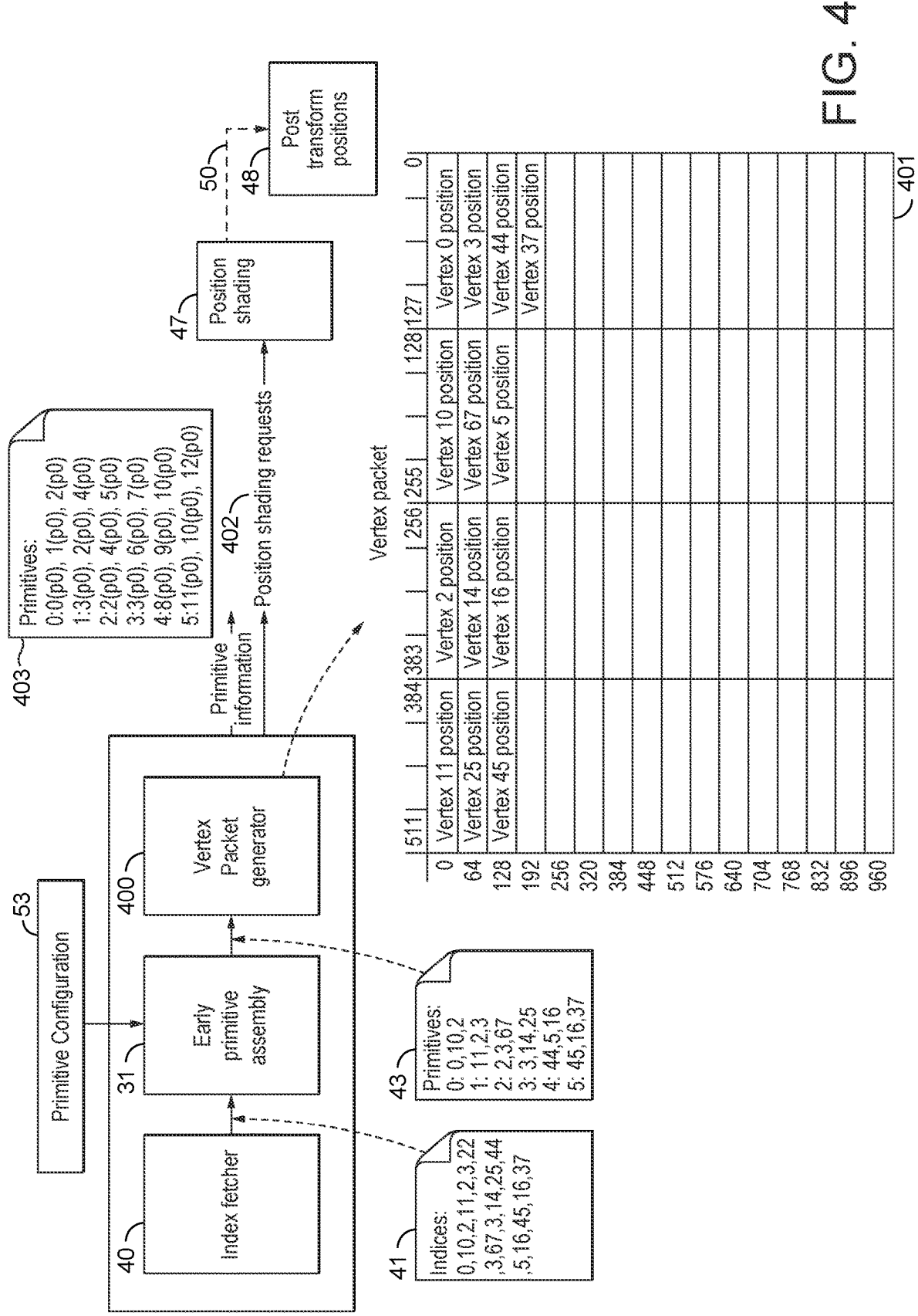
FIG. 4 shows certain parts of the operation of the graphics processor of FIG. 3 in an embodiment.

FIG. 4 shows the generating vertex packets as part of the primitive assembly process in an embodiment, and in particular shows the early primitive assembly stage (circuit) 31 of the graphics processor 2 shown in FIG. 3 and its operation in an embodiment of the technology described herein in more detail.

As shown in FIG. 4, the early primitive assembly process and circuit 31 includes an index fetcher (an index fetching circuit) 40 that fetches and outputs a sequence (stream) of indices 41 from the (stored) vertex index array defined and provided for the output being generated.

(As shown in FIG. 4, the same vertex index may appear more than once in the sequence of indices 41 for the output. It may also be the case that some vertices in the set of vertices for the output will not in fact be included in the sequence of indices for the output.)

The index fetcher 40 provides the sequence of indices 41 to the early primitive assembly stage (circuit) 31, which assembles complete primitives 43 from the stream of indices 41 provided by the index fetcher 40, in accordance with primitive configuration information 53 that defines the type of primitives to be assembled (e.g. whether the assembled primitives are to be in the form of triangles, triangle strips, triangle fans, points or lines, etc.). This primitive configuration information (primitive type definition) 53 may be provided, e.g., as part of a descriptor (metadata) for the output being generated.

The early primitive assembly stage (circuit) 31 is operable to output a sequence 43 of complete assembled primitives from the input stream of indices 41 according to the defined primitive type. At this stage, each (complete) primitive output by the early primitive assembly circuit 31 comprises an identifier for the primitive in the form of a sequence number for the primitive, and a sequence of vertex indices from the input index vertex stream, corresponding to the indices for the vertices to be used for the primitive.

In the present embodiment, the early primitive assembly circuit 31 is operable to discard any degenerate or incomplete primitives at this stage, such that only complete primitives (corresponding to the desired primitive type) will be output. The early primitive assembly circuit 31 may also be operable to subdivide more complex primitives into simpler primitives, such as triangles, lines or points, for output, if desired.

It should also be noted that at this stage, only the indices and the primitive configuration information provided to the early primitive assembly circuit (stage) will have been fetched from memory. At this point in the process, no vertex attributes have been fetched or processed (vertex shaded).

As shown in FIG. 4, the sequence 43 of complete assembled primitives from the early primitive assembly stage (circuit) 31 is provided to a vertex packet generator stage (circuit) 400.

The vertex packet generator 400 operates to generate vertex packets 401 comprising vertices of assembled primitives.

Thus, as illustrated in FIG. 4, the vertex packet generator 400 will allocate vertices of assembled primitives that are received from the earlier primitive assembly 31 to a respective vertex packet(s) 401 in turn. In the present embodiments, each vertex packet 401 has a maximum permitted capacity of vertices, such as 64 vertices, and once that capacity is reached, a new vertex packet is started.

FIG. 4 shows the exemplary content of a vertex packet 401 for the sequence 43 of primitives 0-5 illustrated in FIG. 4. It will be appreciated that as more primitives are assembled, more vertices will be added to the vertex packet 401 until it is full.

In the present embodiments, in order to try to avoid duplication of vertices within vertex packets, the vertex packet generation process keeps track of the vertices that have been added to a vertex packet, and checks whether the vertices for new primitives have already been included in a vertex packet using that vertex tracking information. In the present embodiments, the inclusion of vertices in vertex packets for the vertex packet generation process is tracked for a plurality of, e.g. four, vertex packets, such that it will not only be checked whether a vertex has already been included in the current vertex packet, it will also be determined whether the vertex has been included in up to, e.g. three immediately preceding vertex packets. If a vertex has not been included in the current or three immediately preceding vertex packets then it will be assigned to the packet currently being generated. In an embodiment, any particular primitive will be guaranteed to have its vertices stored within one or more of a predetermined number (and e.g. four) successive vertex packets.

In the present embodiments, the vertices of assembled primitives are added to vertex packets in turn (subject to avoiding any duplication of vertices in the vertex packets), as they appear in assembled primitives. Once a given vertex packet is full (has reached its threshold (maximum capacity) number of vertices), then a new vertex packet is started.

In the present embodiments, and as shown in FIG. 4, the vertex packet generator 400 also triggers the vertex shading of the position attributes 402 for the vertices that have been included in a vertex packet. In the present embodiments, this position shading is triggered for respective vertex packets as a whole, after the vertex packet has been filled up (has reached its permitted capacity of vertices).

The vertex packet generator 400 also re-indexes the indices of the vertices for the assembled primitives to provide "vertex packet-based" indices for the vertices of the assembled primitives. Thus, as shown in FIG. 4, the vertex packet generator 400 will also output a sequence of assembled primitives 403, but with each primitive comprising a set of vertex indices that each identify the vertex packet that the vertex is present in and the position (index) of that vertex in the vertex packet in question. Thus, for example, and as shown in FIG. 4, the vertex packet generator will output for the first primitive (having the primitive index 0) comprising the vertices 0, 10, 2 (from the originally provided set of vertex indices), a corresponding set of vertex-packet-based indexes, 0(p0), 1(p0), 2(p0), indicating its vertices.

To facilitate this the vertex packets generated by the vertex packet generator 400 are correspondingly indexed in the sequence that they are generated, to thereby provide appropriate identifiers (indexes) for the different vertex packets (and that can be used to identify and track the different vertex packets).

Figure 5:
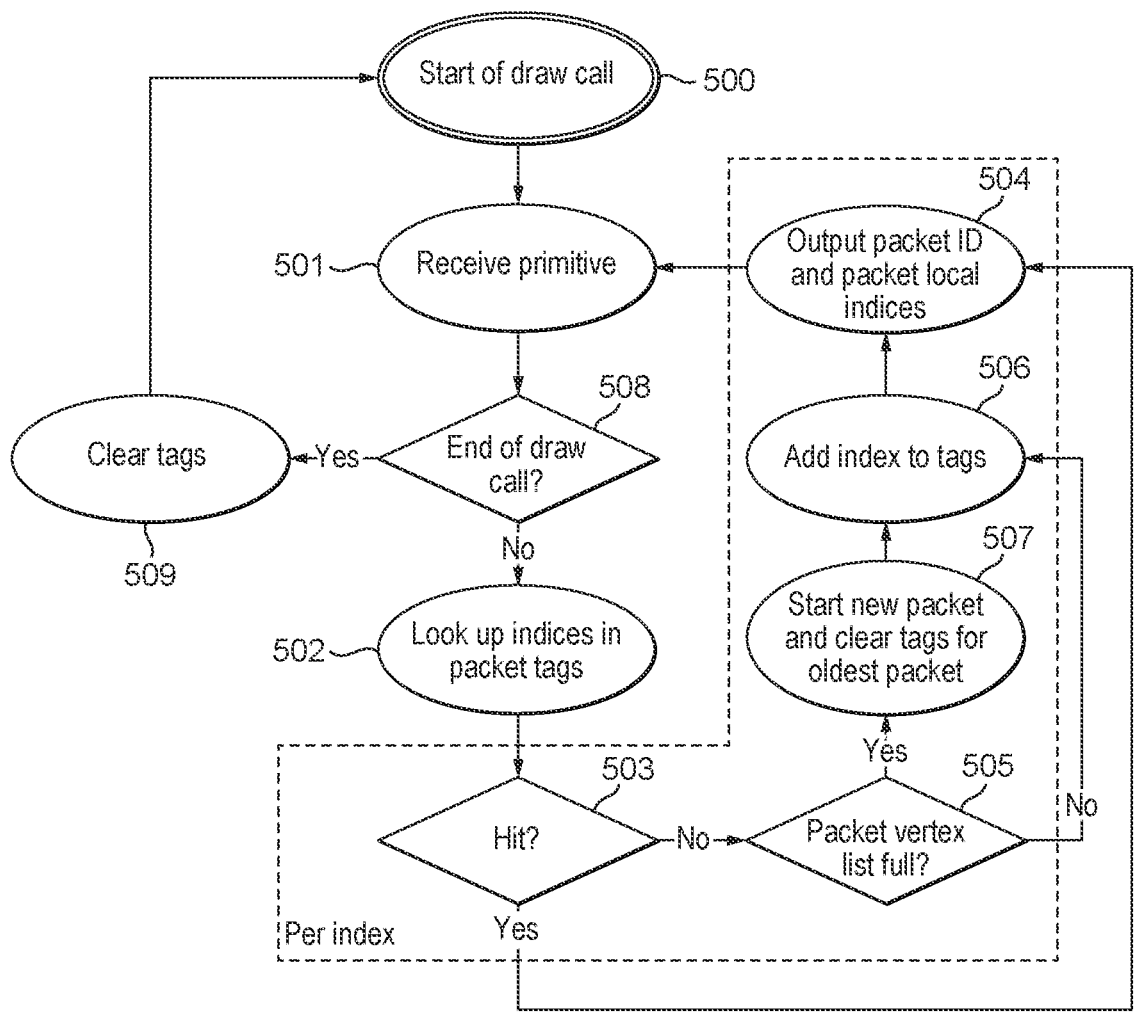
FIG. 5 shows certain parts of the operation shown in FIG. 4 in more detail.

FIG. 5 shows this operation of the vertex packet generator 400 in the present embodiments in more detail.

For the operation illustrated in FIG. 5, it is assumed that the primitives are assembled for respective draw calls, and that for each respective draw call for a render output, a separate sequence of primitives will be assembled and processed.

Thus, as shown in FIG. 5, once a new draw call is started (step 500) the vertex packet generator 400 will receive 501 the assembled primitives for the draw call from the early primitive assembly 31 in turn, and for each primitive, look up the vertex indices for the primitive in tracking information (tags) that is used to track which vertices have been included in a vertex packet (step 502).

As shown in FIG. 5, for each vertex index for a primitive, it is determined whether that vertex is already present in a vertex packet (step 503), and if the vertex is already present in a vertex packet, then the corresponding packet ID and packet local index for the vertex in question is output (step 504), for provision with and for the assembled primitive using the vertex-packet-based indexing scheme.

On the other hand, when at step 503 it is determined that the vertex for a primitive is not already present in a vertex packet, it is then determined whether the current vertex packet is full (has reached its threshold maximum vertex capacity) (step 505).

When the current vertex packet is not full, then the vertex is added to the current vertex packet and the (initial, non-vertex packet based) index for the added vertex is added to the vertex tracking information (tags) for the vertex packet in question (step 506). The corresponding vertex packet ID and packet local index is again then output for the vertex in question (step 504).

On the other hand, when in step 505 it is determined that the current vertex packet is full, then a new vertex packet is started and the vertex index tracking information (tags) for the oldest vertex packet are cleared (step 507).

(As discussed above in the present embodiments, the vertex packet vertex tracking is performed for a queue of, e.g. four vertex packets, with new vertex packets (when required) being added to the end of the queue. Correspondingly, once a packet has been removed from the queue, it is no longer tracked and checked whether later assembled primitives include vertices within that vertex packet. Rather, if a later assembled primitive includes again a vertex that was in a vertex packet that is no longer in the queue (no longer tracked), that vertex will simply be added again to the current vertex packet.)

As before, the index for the new vertex is added to the tracking information for the new vertex packet (step 506), and the new vertex packet ID and packet local index for the vertex in question is output (step 504) for association with the assembled primitive.

This operation is repeated for all the primitives within the draw call, until the end of the draw call is reached (step 508), at which point all the vertex tracking information is cleared (step 509), so that the process can be started again for the next draw call (if any).

This process will be repeated for each draw call of a render output to be generated (and for subsequent render outputs, as appropriate).

The position shading requests 402 are triggered for vertices of a vertex packet in order to perform the appropriate position shading for the vertices in the vertex packet, to thereby generate and store in memory a vertex packet comprising the vertex shaded (transformed) positions for the vertices of the vertex packet.

Vertex shading is in an embodiment performed for those vertices which when generating vertex packets are determined not to be already present in a vertex packet (of the e.g. four vertex packets) being tracked, i.e. for which a "miss" occurs (at step 503) (since shading will not have already been performed for those vertices). In an embodiment, a shading request is triggered for the current packet (to which the vertices having a "miss" are added) after a predetermined number of "misses" occur (for example corresponding to the number of execution threads of the shader core, e.g. 16), rather than waiting for the entire packet to be filled (although the position shading could also or instead be triggered and performed once a vertex packet is full (save for in the case of the final vertex packet for a draw call that may accordingly not be full), if desired).

The position shading request(s) 402 for vertices of a vertex packet are sent to an appropriate position shading stage (position shader (circuit)) 47 (an appropriate execution (shader) core(s) of the graphics processor) that executes appropriate position shading programs for the positions (position attributes) of vertices, to transform the positions from their "model" space definitions to the appropriate "screen" space that the output is being generated with respect to.

The position shading request for vertices of a vertex packet will indicate, inter alia, the indices from the initially provided set of indices for the draw call of the vertices in the vertex packet, so that the appropriate vertices to be position shaded for the vertex packet can be identified. The request may also indicate, for example, and in an embodiment, the position shading operation to be performed (the position shader to be executed), and where the vertex packet, containing the shaded positions for the vertices of the vertex packet, should be stored.

Each vertex will be processed (position shaded) by means of one or more execution threads which will execute the instructions of the (position) shader program in question for the vertex in question. Typically, there will be multiple execution threads each executing at the same time (in parallel).

The position shading process (position shader) 47 executes the position shading programs on a respective programmable processing (execution) core (shader core) or cores of the graphics processor 2.

In the case where the execution (shader) core or cores of the graphics processor are operable to execute plural execution threads (each representing an individual vertex) as a group (warp) together, then the position shading for the vertex packets is in an embodiment performed by executing the position shading as, and for, one or more thread groups (warps). For example, where a vertex packet has a capacity of 64 vertices, and the execution core(s) are operable to execute groups (warps) of 16 threads, then the position shading for a given vertex packet will be performed by issuing four respective thread groups (warps) for execution to perform that position shading.

The processed vertex packets, containing the shaded (transformed) positions, are stored 50 in a post-transform position buffer 48, in memory, from where they can then be fetched for use.

FIG. 6 shows an exemplary vertex packet comprising the transformed positions for all of its vertices, as would, e.g., be generated and stored after the position shading process.

As well as generating the appropriately transformed positions for the vertices, the position shading may also generate other parameters, such as one or more of: variable rate shading parameter values, a point size, line width, and/or a layer ID, etc., if desired. In this case, these additional parameters are in an embodiment also stored with the transformed positions in the vertex packets post transform position buffer 48.

Once the vertex packets, including the transformed vertex positions for the vertices of the vertex packets have been generated and stored in memory, they can then be used when and for processing the assembled primitives.

Figure 7:
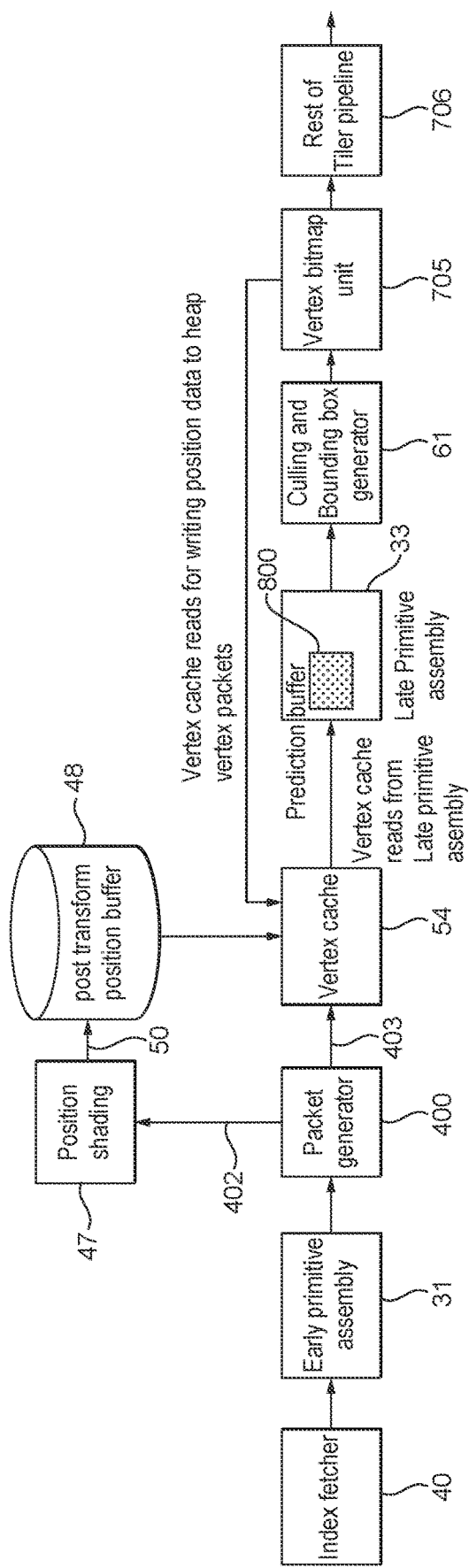
FIG. 7 shows further parts of the operation of the graphics processor of FIG. 3 in an embodiment.

FIG. 7 shows aspects of this operation in an embodiment of the technology described herein.

FIG. 7 shows in particular the next stage of the graphics processing pipeline, which in the present embodiments, comprises a tiling stage of the graphics processing pipeline.

In this regard, the present embodiments relate to and use so-called "tile-based" rendering. In tile-based rendering, the two-dimensional render output (i.e. the output of the rendering process, such as an output frame to be displayed) is rendered as a plurality of smaller area regions, usually referred to as "rendering tiles". In such arrangements, the render output is typically divided (by area) into regularly-sized and shaped rendering tiles (they are usually rectangles, e.g. squares). (Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques wherein the render output is rendered as a plurality of smaller area regions.)

In a tile-based graphics processing pipeline, the geometry (primitives) for the render output being generated is sorted into regions of the render output area, so as to allow the geometry (primitives) that need to be processed for a given region of the render output to be identified. This sorting allows primitives that need to be processed for a given region of the render output to be identified (so as to, e.g., avoid unnecessarily rendering primitives that are not actually present in a region). The sorting process produces lists of primitives to be rendered for different regions of the render output (referred to herein as "primitive" lists but also commonly referred to as "polygon" or "tile" lists).

A render output region for which a primitive list is prepared could be a single rendering tile, or a group of plural rendering tiles, etc.

Once the primitive lists have been prepared, the primitive lists can then be used by the graphics processor to perform the actual rendering of the rendering tiles, with the information stored in the primitive lists being used to identify the primitives to be processed for each rendering tile when generating the desired render output, e.g. to display the frame.

The process of preparing primitive lists for regions of the render output thus basically involves determining the primitives that should be processed for a given render output region. This process is usually carried out by determining (at a desired level of accuracy) the primitives that intersect (i.e. that will appear (at least in part) within) the render output region in question, and then preparing a list of those primitives for future use by the graphics processing system. Thus, for each primitive to be processed, the graphics processor uses the shaded vertex positions for each primitive to determine which region(s) of the render output the primitive at least partially covers (and so should therefore be rendered for).

As will be discussed in more detail below, in the present embodiments, the tiling stage uses, inter alia, the transformed positions for the vertices of the assembled primitives from the generated vertex packets to determine whether assembled primitives are (potentially) visible within the output being generated (and so should be processed further for the output being generated), and, correspondingly, adds any primitives that are determined to be (potentially) visible at the tiling stage appropriately to primitive lists from where they can then be read and processed further.

As shown in FIG. 7, the assembled primitives 403 from the vertex packet generator 400 (i.e. with their vertices indexed using the vertex-packet-based indexing scheme) are provided to a late primitive assembly stage/circuit 33. The assembled primitives 403 are provided to the late primitive assembly storage/circuit 33 via an appropriate latency hiding mechanism (such as a FIFO) (not shown) to allow time for the corresponding position shading to be completed for the vertex packets containing the vertices of the assembled primitives and for the vertex cache 54 (first storage) and "prediction buffer" 800 (second storage) to be loaded with the required vertex packet(s) as will be discussed in more detail below. (Other latency hiding mechanisms, such as repeating the early primitive assembly process at later time to regenerate the sequence of assembled primitives could instead be used, if desired).

The late primitive assembly stage 33 adds the transformed positions to the assembled primitives output by the early primitive assembly stage/circuit 31, and provides the so-assembled primitives to subsequent stages of the tiling process.

As shown in FIG. 7, the late primitive assembly stage 33 is able to acquire the transformed positions for the assembled primitives for this purpose both from a vertex cache 54 that stores the transformed positions for vertices of assembled primitives for use then by the late primitive assembly stage 33, and from an associated "prediction" buffer 800 that, as will be discussed further below, is also used to store and stores transformed positions for vertices of assembled primitives for use by the late primitive assembly process 33. In particular, the prediction buffer 800 corresponds to the second storage of the technology described herein in this embodiment, with the vertex cache 54 corresponding to, and acting as, the first storage of the technology described herein in this embodiment.

In the present embodiments, the vertex cache, first storage 54 is configured as a cache with multiple banks, and is configured to store a plurality of entire generated vertex packets, such as up to eight vertex packets. The prediction buffer, second storage 800 on the other hand is not configured as a cache, but is a register-based storage, and has a capacity to store fewer entire generated vertex packets than the vertex cache 54, such as, in the present embodiment, only two vertex packets. Other arrangements would, of course, be possible.

To facilitate this operation, the graphics processor also includes an appropriate packet fetcher (packet fetching circuit) that is configured to load vertex packets (when they are ready) from the post transform position buffer 48 in the system memory (where they will have been stored following the position shading triggered by the vertex packet generator 400) into the vertex cache 54 and prediction buffer 800 for use by the late primitive assembly process 33. The packet fetcher is configured to load vertex packets (at least) into the vertex cache 54 as they are required and ready, and, correspondingly, to evict vertex packets (at least) from the vertex cache 54 (to provide room for new vertex packets) when they are no longer required in the vertex cache 54. This operation will be discussed in more detail below.

To do this, the packet fetcher receives, inter alia, signals from the vertex packet generator 400 indicating when vertex packets have been completed and the corresponding position shading performed, such that they are ready to be loaded from the memory when required.

The packet fetcher also receives appropriate vertex packet evict signals from a vertex bitmap unit 705, indicative of when a vertex packet is no longer required in the vertex cache 54 and so can be evicted from the vertex cache 54. This will be discussed in more detail below.

The vertex packet fetcher is in general configured and operable to maintain a set of vertex packets in the vertex cache 54 such that the required transformed positions for assembled primitives to be processed will be expected to be present in the vertex cache 54 when the primitives fall to be processed by the late primitive assembly stage 33. As discussed above, a latency hiding mechanism assists in this by, in effect, delaying the provision of the assembled primitives to the late primitive assembly 33, to thereby allow the necessary vertex position shading to be performed, and the so-generated vertex packet to be loaded into the vertex cache 54 before a primitive that requires vertices in a vertex packet will be received and processed by the late primitive assembly stage 33.

As discussed above, the sequence 403 of complete assembled primitives from the early primitive assembly stage (circuit) 31 is provided to the late primitive assembly stage (circuit) 33.

It may also be checked at this stage whether the required vertex packets containing the vertices of the assembled primitives are present in the vertex cache 54 (and to, if necessary, stall the processing of the sequence of assembled primitives if the vertices for an assembled primitive are not present in the vertex cache 54). This check may be based on, for example, and in an embodiment, an indication of which vertex packets the vertices of the assembled primitives are present in, and there may correspondingly be a maintained record, such as a bitmap, of those vertex packets that are already stored in the vertex cache 54 to facilitate this check. (As discussed above, the expectation is that the loading of vertex packets into the vertex cache 54 should be able to be done sufficiently in advance that the vertex packet(s) containing the vertices for an assembled primitive should be present in the vertex cache 54 by the time the assembled primitive falls to be processed by the later primitive assembly stage (circuit) 33.)

The late primitive assembly stage/circuit 33 associates each assembled primitive in the sequence 403 with the corresponding transformed positions for the vertices for the primitive in question, and accordingly outputs a corresponding sequence of assembled primitives, which primitives, at this stage, now each comprise the primitive identifier and a sequence of shaded (transformed) positions for the primitives in the sequence. The so-assembled primitives are then sent to the next stage of the tiling process for tiling (and subsequently rasterising and rendering, as discussed above with reference to FIG. 3).

As shown in FIG. 7, the tiling process first comprises a culling and bounding box generator stage/circuit 61, which is followed by a vertex bitmap unit 705, which is then followed by further tiling stages 706, such as a binner and iterator stage/circuit and a primitive (polygon) list writing circuit (that writes the primitives to primitive lists, e.g. in memory, for future use).

The culling and bounding box generator 61 generates appropriate bounding boxes for the assembled primitives output by the late primitive assembly stage/circuit 33, and also operates to identify any primitives that can be culled from further processing on the basis of their (potential) visibility. This culling may comprise, for example, front/back-face culling, frustum culling, and/or sample aware culling, etc.

The bounding box generation uses the provided positions for the assembled primitives to generate appropriate bounding boxes for the primitives. In the present embodiment, bounding boxes at the resolution of the individual tiles that the output is divided into for rendering purposes are used, but other arrangements would, of course, be possible.

The culling process determines whether a primitive is (potentially) visible or not. For any primitive that is determined not to be potentially visible, the primitive is culled, but otherwise the primitive is retained and passed on for processing.

The output from the culling and bounding box generation comprises for each primitive an identifier for the primitive, a set of vertex indices for the primitive, and bounding box information for the primitive (in the present embodiment in the form of which rendering tile or tiles the primitive falls within).

The primitives with their bounding boxes are then passed to a vertex bitmap unit 705 that, based on the vertices of primitives that have passed the culling stage 61, triggers vertex attribute processing (vertex shading) for any remaining (non-position) attributes (varyings) of vertices belonging to primitives that have passed the culling process.

Again this further vertex shading of other vertex attributes (varyings) is performed by sending appropriate requests for that processing to an appropriate vertex shading process of the graphics processor.

The processed other vertex attributes (varyings) are then added appropriately to the generated vertex packets, such that the vertex packets then store both the transformed positions and other processed vertex attributes (varyings) for the vertices that they relate to.

The vertex bitmap unit 705 also correspondingly reads the transformed positions for vertices of assembled primitives that have survived the visibility culling test from the vertex cache (first storage) 54 and writes them back to the appropriate vertex packets in the memory, such that the appropriate transformed positions are available for use for assembled primitives outside of the tiler (the tiling process). Accordingly, the vertex bitmap unit 705 is configured and operable to be able to read transformed positions for vertices from the vertex cache (first storage) 54 (but not from the prediction buffer (second storage) 800).

The vertex bitmap unit 705 also sends appropriate vertex packet evict signals (to the packet fetcher) to indicate when vertex packets may be (safely) evicted from the vertex cache 54.

To facilitate this operation, the vertex packet generation process includes with the sequence of assembled primitives an indication of when no more assembled primitives will use a particular vertex packet (after all the assembled primitives that will use a vertex packet have been included in the sequence of assembled primitives). In the embodiment shown in FIG. 7, this indication is provided by the vertex packet generator 400 when a vertex packet is evicted from the vertex packet "queue" as the vertex packets are being assembled and sent for vertex shading (i.e. at step 507 in FIG. 5).

When the vertex bitmap unit sees the indication that no more assembled primitives that will use a vertex packet will follow in the sequence of assembled primitives, then it can determine that all assembled primitives that will use a particular vertex packet have passed the late primitive assembly, and in particular the culling and bounding box generation, stages, such that there will be no more primitives that will require the vertex packet from the vertex cache 54. It accordingly then sends a vertex packet evict signal to indicate that the vertex packet in question can be safely evicted from the vertex cache 54.

The primitives with their bounding boxes are then passed, e.g., to a binning and iterator stage/circuit, which operates to identify using the bounding boxes for the primitives which primitive lists the primitives should be listed in (by comparing the bounding boxes for the primitives with the respective primitive list regions), and outputs the respective primitives and their target primitive list(s) (bin(s)).

A primitive (polygon) list writing stage/circuit may then write the primitives into the respective primitive (polygon) lists in memory. The primitive lists may be compressed before being written to memory.

The above-described processing in FIG. 7 up to and including the preparation and writing of the primitive lists can be considered to be a sequence of appropriate geometry processing (geometry stages) of the overall graphics processing sequence and graphics processing pipeline that is executed when generating an output.

As will be appreciated, there will then be subsequent processing stages that are performed once the primitive lists have been prepared (and that can correspondingly be considered to be a sequence of fragment processing stages (fragment stages) that are performed when generating an output).

As the present embodiments use tile-based rendering, these fragment stages will be performed for respective tiles of the output being generated separately.

These "fragment stages" may, for example, and in an embodiment, start with a primitive (polygon) list reader stage/circuit reading the primitive list or lists applying to the tile that is being processed and outputting (providing to the subsequent processing stage) a sequence of primitives to be processed for the tile in question.

There may then be a vertex fetcher stage that is operable to fetch vertex attributes, and in particular the appropriately vertex shaded positions, for the primitives provided by the primitive list reader for the tile being processed.

The sequence of primitives may then be provided to a triangle (primitive) setup stage/circuit that performs any required primitive (triangle) setup processing, such as deriving line equations for the edges of the primitives.

Once primitive (triangle) setup has been performed for a primitive, the primitive may be provided to a rasteriser for rasterisation into graphics fragments, which fragments are then provided to appropriate rendering (fragment processing) stages/circuits of the pipeline. The rendering (fragment processing) that is performed can comprise any suitable and desired rendering (fragment processing) that may be performed for a graphics processing pipeline. It in an embodiment comprises at least performing fragment shading of the fragments.

The rasteriser and rendering (fragment processing) can be performed in any suitable and desired manner, such as, and in an embodiment, in the normal manner for the graphics processor and graphics processing pipeline in question.

The rendered fragment data is then appropriately output to memory, from where it may then be used, e.g. for display or other purposes. (The processed fragment data will be written out to memory via an appropriate tile buffer, as the graphics processor and pipeline performs tile based graphics processing.)

As discussed above, in the present embodiments, the late primitive assembly process/circuit 33 is operable to obtain processed vertex attributes (positions) for associating with assembled primitives and providing to the tiling process both from the prediction buffer 800 and the vertex buffer 54. In particular, the late primitive assembly 33 will first attempt to read the vertex attributes (the transformed positions) for an assembled primitive from the prediction buffer 800, but when the process vertex attributes for an assembled primitive are not available in the prediction buffer 800, they will be read from the vertex cache 54 instead.

Figure 8:
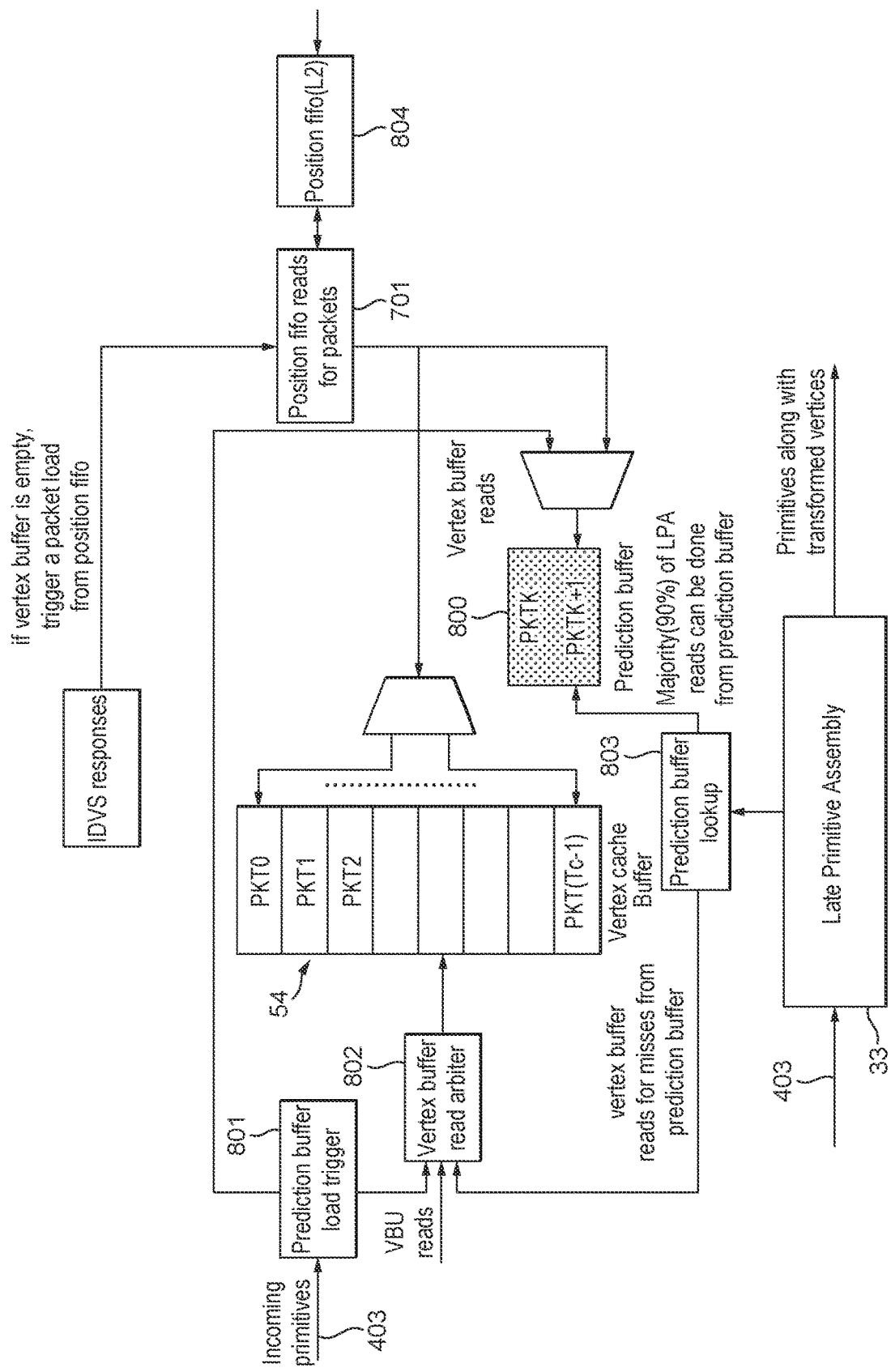
FIGS. 8 and 9 show in more detail the storing and use of processed vertex attributes in an embodiment.
Figure 9:
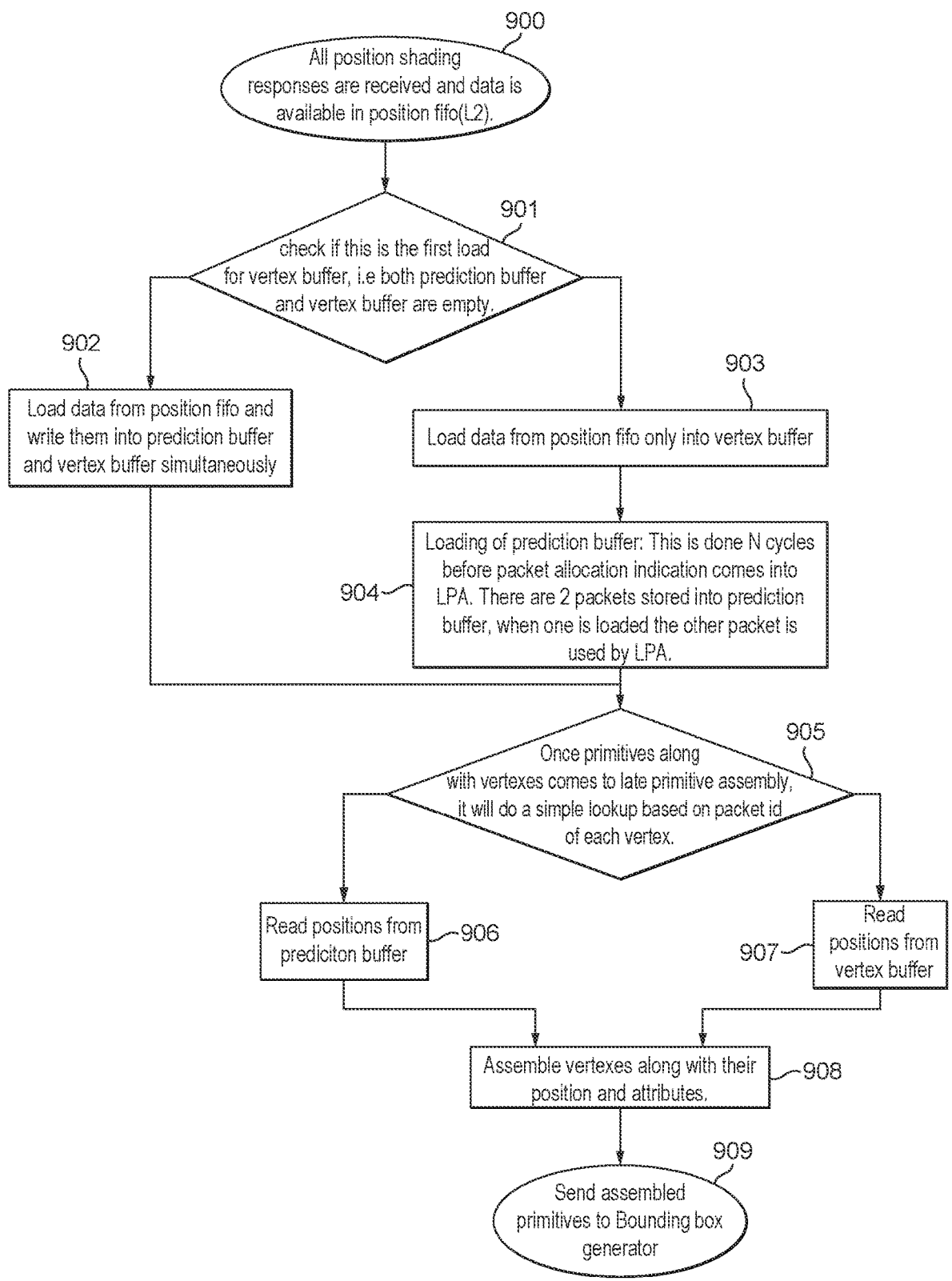

FIGS. 8 and 9 show the arrangement and use of the vertex cache 54 (the first storage) and the prediction buffer 800 (the second storage) by and for the late primitive assembly process 33 in the present embodiment.

FIG. 8 is a system diagram showing the arrangement of the vertex cache 54, prediction buffer 800, etc., in the present embodiment. FIG. 9 is a flow chart illustrating the operation in relation to the vertex cache 54 and the prediction buffer 800 in the present embodiment.

As shown in FIG. 8, and as discussed above, the vertex cache 54 is configured to be able to store a plurality of generated vertex packets (pkt0, . . . pkt(tc−1).

For example an oldest vertex packet in the vertex cache 54 may be designated as being "evictable" and so able to be evicted to allow a new vertex packet to be loaded, and be followed by a sequence of vertex packets that may be being used for assembled primitives, and the oldest of which will be the next packet to be evicted. There may then be vertex packets that are not yet in use, but which are being prepared and so can be preloaded into the vertex cache once they are ready.

When a vertex packet is ready, the packet fetcher will wait for there to be storage available in the vertex cache for a new vertex packet, and will then, if necessary, wait for the next vertex packet to be available in memory (i.e. to have its position shading completed), and once a next packet is available, load that vertex packet into the vertex cache.

For the corresponding vertex packet "eviction" process, the vertex fetcher will wait for a "packet evict" message, and in response to that free up the storage used for the vertex packet in question in the vertex cache (so that it is available for use for a vertex new packet).

The prediction buffer 800 is configured to store two generated vertex packets (pktk, pktk+1) at any given time.

As shown in FIG. 8, the vertex packets are loaded into the vertex cache 54 and the prediction buffer 800 from the transformed position buffer 48 in the main memory via an appropriate position queue (FIFO) 804 that queues transformed positions for vertex packets in the order in which they are included in the vertex packets.

When a vertex packet is to be loaded into either the vertex cache 54 or the prediction buffer 800, an appropriate vertex packet fetcher 701 reads the vertex packets from the position queue 804, and loads the vertex packets into the vertex cache 54 and/or the prediction buffer 800, as appropriate.

As shown in FIG. 8, vertex packets are (always) loaded into the vertex cache 54 by the packet fetcher 701. In the case of the prediction buffer 800, as shown in FIG. 8, vertex packets can be loaded into the prediction buffer by the packet fetcher 701, or can be loaded into the prediction buffer 800 from the vertex cache 54. This operation will be discussed in more detail below with reference to FIG. 9.

As shown in FIG. 8, the late primitive assembly 33 is able to look up processed vertex attributes for primitives that it receives for processing in both the prediction buffer 800 and the vertex cache 54. This is done by a prediction buffer lookup (circuit) 803.

As will be discussed further below in relation to FIG. 9, the prediction buffer lookup 803 first attempts to retrieve the processed vertex attributes for an assembled primitive required by the late primitive assembly 33 from the prediction buffer 800, and when the processed vertex attributes are present in the prediction buffer 800, the processed attributes are retrieved therefrom for use by the late primitive assembly 33. Only in the case where the processed vertex attributes are not present in the prediction buffer 800 are the vertex attributes then fetched from the vertex cache 54 instead.

As shown in FIG. 8, the vertex cache 54 can be read both by and for the late primitive assembly 33 in this manner (and for loading the prediction buffer 800), but also by, as discussed above in relation to FIG. 7, the vertex bitmap unit 705. Thus there is an appropriate vertex buffer read arbiter 802 that controls read access to the vertex cache 54.

The loading of vertex packets into the prediction buffer 800 is configured such that there will be one vertex packet in the prediction buffer 800 that is currently being read and used for primitives being processed by the late primitive assembly 33, with the other vertex packet correspondingly being loaded into the prediction buffer for use for the next primitives expected to be in the sequence of assembled primitives (once the current vertex packet that is being read in the prediction buffer has been finished with).

As discussed above, the vertex packets are generated in the order that the primitives are assembled and included in the sequence of assembled primitives. Thus, it should correspondingly be the case that a given (contiguous) sequence of primitives will use the vertices in the vertex packet (or packets) that were generated when assembling that sequence of primitives. Thus, by ensuring that the vertex packets are loaded into the prediction buffer for use in turn, and in the sequence that they were generated in when assembling the primitives, it can be substantially ensured to be the case that the vertex packets will be present in the prediction buffer 800 in the order that the corresponding assembled primitives will arrive at the late primitive assembly 33 for processing. Correspondingly, this can then be used to (try to) ensure that the relevant vertex packet will be present in the prediction buffer 800 when the corresponding assembled primitives fall to require the processed vertex attributes stored in that vertex packet for late primitive assembly.

In the present embodiment, this is further facilitated by, as shown in FIG. 8, using the sequence of incoming primitives 403 to trigger 801 loads of vertex packets into the prediction buffer 800. The sequence of incoming primitives 403 is provided to the prediction buffer load trigger 801 in advance of the corresponding primitives arriving at the late primitive assembly 33 (and, correspondingly, the provision of the sequence of assembled primitives 403 to the late primitive assembly 33 is delayed relative to the provision of the sequence of incoming primitives to the prediction buffer load trigger 801 by an appropriate latency hiding mechanism, e.g. such as a FIFO as discussed above), so as to allow the loading of the required vertex packet into the prediction buffer 800 to be triggered (sufficiently far) in advance to (try to) ensure that the required vertex packet will be present in the prediction buffer 800 when the corresponding sequence of assembled primitives that will use that vertex packet arrives at the late primitive assembly 33 for processing In the present embodiment, this operation uses the packet identifiers associated with the assembled primitives (where the assembled primitives have vertex packet-based vertex indices associated with them), such that, and in an embodiment, when a new vertex packet ID is seen for an assembled primitive in the sequence of assembled primitives by the prediction buffer load trigger 801, that is then used to trigger the loading of the next vertex packet (having the identified packet ID) into the prediction buffer 800 (and correspondingly the eviction of the oldest vertex packet from the prediction buffer 800).

FIG. 9 is a flow chart showing the operation of the vertex cache 54 and prediction buffer 800 in the present embodiment.

FIG. 9 shows the process when at least some position shading triggered by the early primitive assembly has been completed, such that at least one vertex packet comprising transformed vertex positions is available for loading into the vertex cache 54 and the prediction buffer 800 (step 900).

As shown in FIG. 9, in the case when the primitive assembly process, etc., is first starting, such that currently no vertex packets are stored in the vertex cache 54 or the prediction buffer 800, then an appropriate set of ready vertex packets are loaded into the vertex cache 54 and prediction buffer 800 from the memory directly (steps 901 and 902).

On the other hand, when there are already vertex packets present in the vertex cache 54 and prediction buffer 800, then when new data is available (e.g. because a new vertex packet has been generated and stored in the memory), that new vertex packet is first loaded into the vertex cache 54 only (step 903).

Then, in response to an appropriate prediction buffer load trigger 801 triggered by the identification, e.g., of the need of a new vertex packet for primitives in the sequence of assembled primitives to be processed, the identified new (next) vertex packet is loaded into the prediction buffer 800 to replace the oldest vertex packet presently in the prediction buffer 800 (step 904). This is done an appropriate number of cycles in advance of when the vertex packet should be required for the late primitive assembly 33.

Steps 903 and 904 will be appropriately repeated to load all the vertex packets required for the assembled primitives into the vertex cache 54 and prediction buffer 800 in turn, such that over time, the entire sequence of assembled vertex packets for the sequence of assembled primitives to be processed will pass through the vertex cache 54 and prediction buffer 800 in turn (and in order).

FIG. 9 also shows the corresponding reading of processed vertex attributes for assembled primitive from the prediction buffer 800 or vertex cache 54 by the late primitive assembly 33 in the present embodiments.

As shown in FIG. 9, when assembled primitives are received by the late primitive assembly process 33, the late primitive assembly process 33 triggers an appropriate prediction buffer lookup 803 to determine if the processed vertex attributes for the primitive in question are stored in the prediction buffer 800 or not (step 905).

To do this, the prediction buffer lookup 803 performs a lookup based on the packet ID of each vertex for the primitive in question, to determine whether the corresponding vertex packet is present in the prediction buffer or not. (It is correspondingly tracked which vertex packets are currently stored in the prediction buffer 800.) If the appropriate vertex packet is present in the prediction buffer 800, then the corresponding transformed position for the vertex in question is read from the prediction buffer (step 906). This will use the vertex ID within the vertex packet in question (corresponding to the offset of the vertex within the packet in question) to identify the required transformed position (entry) in the prediction buffer.

(As discussed above, the assembled primitives are, in the present embodiments, provided to the late primitive assembly with their vertices indexed using a vertex packet-based indexing scheme, so the required vertex packet can be identified from the indices for the vertices for an assembled primitive.)

On the other hand, in the case where the relevant vertex packet is not stored in the prediction buffer, then the transformed position (processed vertex attribute) for the primitive vertex in question is instead read from the vertex cache 54 (step 907). (As discussed above, the operation is configured such that a vertex packet containing the transformed position for an assembled primitives should be present in the vertex cache 54 when that primitive falls to be processed by the late primitive assembly 33 (even if the vertex packet is not present in the prediction buffer 800). In the event that the required vertex packet is not present in the vertex cache 54 either, then the late primitive assembly processing can be appropriately stalled, and the fetching of the required vertex packet into the vertex cache 54 triggered.)

Once the processed vertex attributes (transformed positions) for the vertices of an assembled primitive have been read (from the prediction buffer 800, or the vertex cache 54, or both), then the processed vertex attributes are associated with the assembled primitive (step 908) and provided to the next stage of the tiling process (step 909).

As will be appreciated by those skilled in the art, the technology described herein, in its embodiments at least, can provide a more efficient graphics processing pipeline, in particular with respect to the processing and handling of vertex attributes for primitives being processed. This is achieved, in embodiments of the technology described herein, by storing processed vertex attributes for use for assembled primitives both in a first, "main", storage and a second, smaller and faster, storage, and then preferentially attempting to and reading the processed vertex attributes from the second storage, but reading the processed vertex attributes for an assembled primitive from the first storage where necessary.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processor when processing a sequence of one or more primitives for an output, the method comprising:
    performing vertex attribute processing for vertices of primitives of the sequence of one or more primitives, to generate one or more processed vertex attributes for vertices of the primitives;
    storing processed vertex attributes for vertices of the primitives in a first storage, and additionally storing processed vertex attributes for vertices of the primitives in a second storage,
    wherein the processed vertex attributes are loaded into and evicted from the first storage and the second storage as respective vertex packets, each vertex packet containing processed vertex attributes for a plurality of vertices for primitives;
    for a primitive of the sequence of one or more primitives, obtaining processed vertex attributes for the primitive, wherein the obtaining processed vertex attributes for the primitive comprises checking whether processed vertex attributes for the vertices of the primitive are present in the second storage, and when the processed vertex attribute for a vertex of the primitive is present in the second storage then reading the processed vertex attribute from the second storage, and when the processed vertex attribute for a vertex of the primitive is not present in the second storage then reading the processed vertex attribute from the first storage; and
    providing primitives of the sequence of one or more primitives and read processed vertex attributes to a later stage of the graphics processing pipeline that is being executed by the graphics processor for processing.

2. The method of claim 1, wherein the processed vertex attributes are stored in and obtained from the second storage for only a single, specific intended use of the processed vertex attributes, whereas the processed vertex attributes are stored in and obtained from the first storage both for use when processed vertex attributes cannot be obtained from the second storage, and also for use for obtaining processed vertex attributes for at least one other purpose.

3. The method of claim 1, wherein the processed vertex attributes stored in the second storage as respective vertex packets, are obtained from the second storage for the purpose of associating the processed vertex attributes with the primitives for provision to a tiling stage of the graphics processing pipeline.

4. The method of claim 1, wherein the first storage is a cache-based storage, comprising a plurality of banks.

5. The method of claim 1, wherein the second storage is configured and operable such that any combination of individual processed vertex attributes in a vertex packet stored in the second storage up to a maximum number of individual processed vertex attributes can be read from the second storage in a single processing cycle.

6. The method of claim 1, wherein storing processed vertex attributes in the second storage comprises loading processed vertex attributes as respective vertex packets from the first storage into the second storage, and the second storage stores a copy of a subset of the processed vertex attributes that are currently stored in the first storage.

7. The method of claim 1, wherein the vertex packets containing the processed vertex attributes are stored in the second storage in turn, in an order that the vertex packets are generated as primitives of the sequence of one or more primitives are assembled.

8. The method of claim 1, wherein the use of vertex packets by primitives in the sequence of assembled primitives is tracked, and when a next primitive in the sequence of assembled primitives uses a new vertex packet, the loading of that new vertex packet into the second storage is triggered.

9. The method of claim 1, wherein obtaining processed vertex attributes for a primitive comprises:
first performing a lookup in the second storage to determine whether a vertex packet storing the processed vertex attribute(s) for a vertex of the primitive is present in the second storage or not;
when the required vertex packet is present in the second storage, then reading the processed vertex attribute for the vertex from the vertex packet in the second storage;
in response to the lookup in the second storage determining that the required vertex packet is not present in the second storage, then reading the processed vertex attribute for the vertex from the vertex packet in the first storage.

10. The method of claim 1, wherein the second storage has a smaller capacity for storing vertex packets than the first storage.

11. The method of claim 1, wherein a vertex packet is evicted from the second storage when a new vertex packet is loaded into the second storage, without tracking whether primitives that will require the evicted vertex packet have undergone processing by the later stage of the graphics processing pipeline.

12. A graphics processor operable process a sequence of one or more primitives when generating an output, the graphics processor comprising:
a vertex attribute processing circuit configured to perform vertex attribute processing for vertices of primitives of a sequence of one or more primitives, to generate one or more processed vertex attributes for vertices of the primitives of the sequence of one or more primitives;
storage comprising a first storage and a second storage, wherein the graphics processor is configured to store processed vertex attributes for primitives of the sequence of one or more primitives in the first storage, and additionally store processed vertex attributes for vertices of primitives of the sequence of one or more primitives in the second storage,
wherein the graphics processor is configured to load processed vertex attributes into and evict processed vertex attributes from the first storage and the second storage as respective vertex packets, each vertex packet containing processed vertex attributes for a plurality of vertices for primitives of the sequence of one or more primitives;
an attribute obtaining circuit configured to obtain processed vertex attributes for primitives of the sequence of one or more primitives, wherein the attribute obtaining circuit is configured to, when obtaining processed vertex attributes for a primitive of the sequence of one or more primitives, check whether processed vertex attributes for the vertices of the primitive are present in the second storage, and when the processed vertex attribute for a vertex of the primitive is present in the second storage then read the processed vertex attribute from the second storage, and when the processed vertex attribute for a vertex of the primitive is not present in the second storage then read the processed vertex attribute from the first storage; and
wherein the graphics processor is configured to provide primitives of the sequence of one or more primitives and read processed vertex attributes to a later stage of the graphics processing pipeline for processing.

13. The graphics processor of claim 12, wherein the processed vertex attributes are stored in and obtained from the second storage for only a single, specific intended use of the processed vertex attributes, whereas the processed vertex attributes are stored in and obtained from the first storage both for use when processed vertex attributes cannot be obtained from the second storage, and also for use for obtaining processed vertex attributes for at least one other purpose.

14. The graphics processor of claim 12, wherein the processed vertex attributes stored in the second storage as respective vertex packets are obtained from the second storage for the purpose of associating the processed vertex attributes with the primitives of the sequence of one or more assembled primitives for provision to a tiling stage of the graphics processing pipeline.

15. The graphics processor of claim 12, wherein the first storage is a cache-based storage, comprising a plurality of banks.

16. The graphics processor of claim 12, wherein the second storage is configured and operable such that any combination of individual processed vertex attributes stored in a vertex packet in the second storage up to a maximum number of individual processed vertex attributes can be read from the second storage in a single processing cycle.

17. The graphics processor of claim 12, wherein the graphics processor is configured to store processed vertex attributes in the second storage by loading processed vertex attributes as respective vertex packets from the first storage into the second storage, and the second storage stores a copy of a subset of the processed vertex attributes that are currently stored in the first storage.

18. The graphics processor of claim 12, wherein the vertex packets containing the processed vertex attributes are stored in the second storage in turn, in the order that the vertex packets are generated as primitives of the sequence of one or more primitives are assembled.

19. The graphics processor of claim 12, wherein the attribute obtaining circuit is configured to obtain processed vertex attributes for a primitive of the sequence of one or more primitives by:
first performing a lookup in the second storage to determine whether a vertex packet storing the processed vertex attribute(s) for a vertex of the primitive is present in the second storage or not;
when the required vertex packet is present in the second storage, then reading the processed vertex attribute for the vertex from the vertex packet in the second storage;
in response to the lookup in the second storage determining that the required vertex packet is not present in the second storage, then reading the processed vertex attribute for the vertex from the vertex packet in the first storage.

20. A non-transitory computer readable storage medium storing computer software code which when executing on a processor performs a method of operating a graphics processor when processing a sequence of one or more primitives for an output, the method comprising:

performing vertex attribute processing for vertices of primitives of the sequence of one or more primitives, to generate one or more processed vertex attributes for vertices of the primitives;

storing processed vertex attributes for vertices of the primitives in a first storage, and additionally storing processed vertex attributes for vertices of the primitives in a second storage, wherein the processed vertex attributes are loaded into and evicted from the first storage and the second storage as respective vertex packets, each vertex packet containing processed vertex attributes for a plurality of vertices for primitives;

for a primitive of the sequence of one or more primitives, obtaining processed vertex attributes for the primitive, wherein the obtaining processed vertex attributes for the primitive comprises checking whether processed vertex attributes for the vertices of the primitive are present in the second storage, and when the processed vertex attribute for a vertex of the primitive is present in the second storage then reading the processed vertex attribute from the second storage, and when the processed vertex attribute for a vertex of the primitive is not present in the second storage then reading the processed vertex attribute from the first storage; and providing primitives of the sequence of one or more primitives and read processed vertex attributes to a later stage of the graphics processing pipeline that is being executed by the graphics processor for processing.

* * * * *